United States Patent
Shin

(10) Patent No.: US 10,582,111 B2
(45) Date of Patent: Mar. 3, 2020

(54) SYSTEMS AND METHODS FOR AUTOFOCUS AND DEPTH MAP GENERATION

(71) Applicant: QUALCOMM Incorporated, San Diego, CA (US)

(72) Inventor: Mooyoung Shin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/941,789

(22) Filed: Mar. 30, 2018

(65) Prior Publication Data

US 2019/0306405 A1    Oct. 3, 2019

(51) Int. Cl.
*H04N 5/232* (2006.01)
*G06T 7/571* (2017.01)

(52) U.S. Cl.
CPC ......... *H04N 5/23212* (2013.01); *G06T 7/571* (2017.01); *G06T 2207/10028* (2013.01)

(58) Field of Classification Search
CPC .......... H04N 5/23212; H04N 5/232127; G06T 7/571; G06T 2207/10028
USPC ................ 348/335, 340, 345, 348, 350, 352
See application file for complete search history.

(56) References Cited

U.S. PATENT DOCUMENTS

| | | | |
|---|---|---|---|
| 9,344,621 B2 | 5/2016 | Omata et al. | |
| 9,477,138 B2 | 10/2016 | Brunner et al. | |
| 9,686,463 B2 | 6/2017 | Deng et al. | |
| 2009/0167923 A1* | 7/2009 | Safaee-Rad | H04N 5/23212 348/345 |
| 2009/0167930 A1 | 7/2009 | Safaee-Rad et al. | |
| 2010/0157086 A1* | 6/2010 | Segale | G01N 21/6458 348/222.1 |
| 2015/0035855 A1 | 2/2015 | Kim et al. | |
| 2016/0110604 A1 | 4/2016 | Yoneyama | |
| 2017/0118394 A1 | 4/2017 | Van Hoeckel et al. | |
| 2017/0188017 A1 | 6/2017 | Hall | |

* cited by examiner

*Primary Examiner* — Yogesh K Aggarwal
(74) *Attorney, Agent, or Firm* — Paradice and Li LLP

(57) ABSTRACT

Aspects of the present disclosure relate to systems and methods for generating a depth map. An example device may include one or more processors and a memory. The memory may include instructions that, when executed by the one or more processors, cause the device to receive a first intensity measurement for each of a plurality of focal regions for a camera at a first focal length, determine, from the first intensity measurements, a first focus value for each of the plurality of focal regions, generate a depth map of an indication of focal lengths for the plurality of focal regions based on the first focus values for the plurality of focal regions, and use the depth map in determining when to perform or in performing an autofocus operation for the camera.

23 Claims, 18 Drawing Sheets

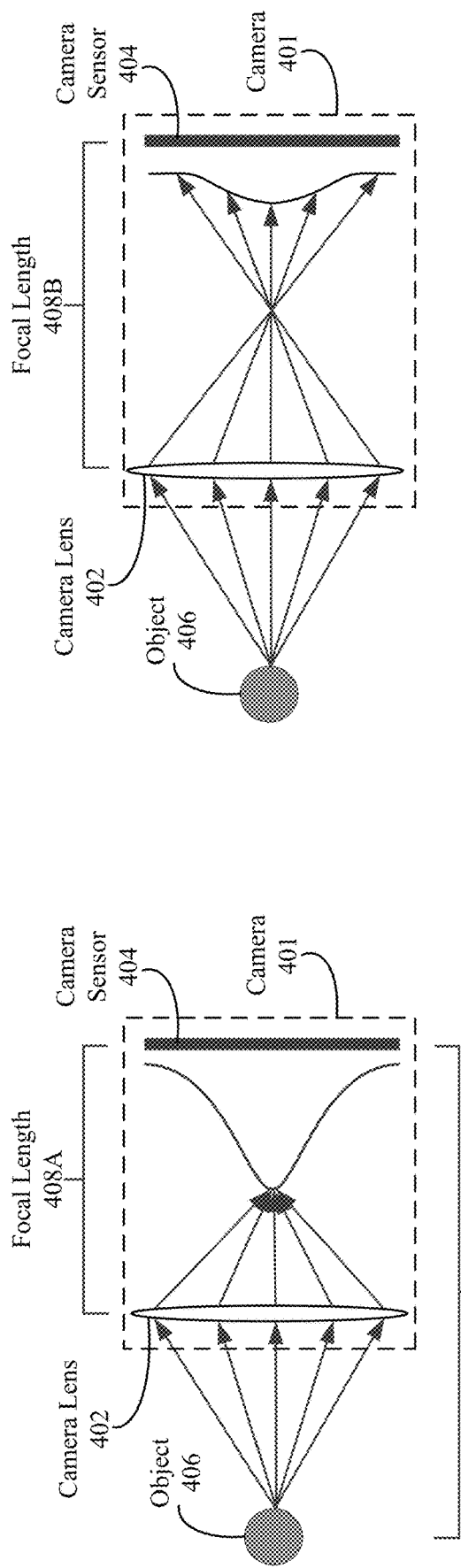
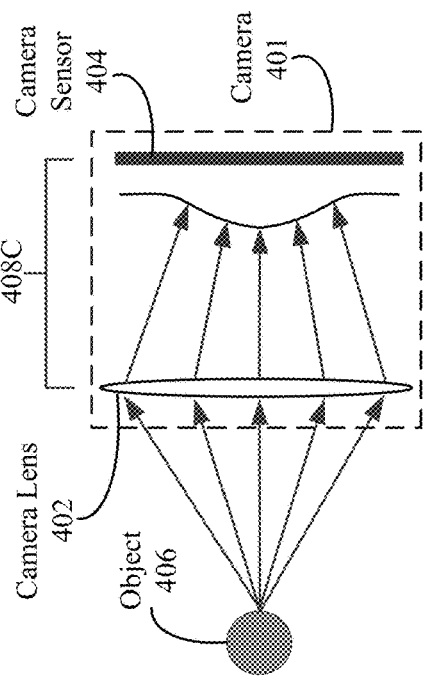
FIG. 4A
FIG. 4B
FIG. 4C

SYSTEMS AND METHODS FOR AUTOFOCUS AND DEPTH MAP GENERATION

TECHNICAL FIELD

This disclosure relates generally to systems and methods for image capture devices, and specifically to generating depth maps and autofocus operations for a camera.

BACKGROUND OF RELATED ART

Devices including or coupled to one or more digital cameras use a camera lens to focus incoming light onto a camera sensor for capturing digital images. The camera lens has a focal length that places a range of depth of the scene in focus. Portions of the scene closer or further than the range of depth may be out of focus, and therefore appear blurry in a resulting image. The distance of the camera lens from the camera sensor indicates the distance of the range of depth for the scene from the camera lens that is in focus. Many devices are capable of moving the camera lens to adjust the distance between the camera lens and the camera sensor, thereby adjusting which portions of a scene appear in focus for captured images.

A device may attempt to determine the position of the camera lens to place a portion of interest of the scene in focus. In one example, a user may touch an area of a preview image provided by the device (such as a person or landmark in the previewed scene) to indicate the portion of the scene to be in focus. In another example, the device may automatically determine a portion of the scene to be in focus. In response, the device may perform autofocus (AF) operations to automatically adjust the camera lens position so that the portion of the scene is in focus for subsequent image captures.

Changes in the scene, such as the user moving the camera or objects entering or exiting the scene, may cause the device to determine that the camera lens position may need to be adjusted. For example, an object entering the scene may cause a device to retrigger AF operations for determining a camera lens position. For some AF operations, devices may use information sensed by the camera sensor or a separate ranging system in creating a depth map for the scene. The depth map indicates depths of different portions of a scene from the camera or ranging system. The depth map may be used for AF operations as well as other operations, such as object recognition and detection.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for generating a depth map. An example device may include one or more processors and a memory. The memory may include instructions that, when executed by the one or more processors, cause the device to receive a first intensity measurement for each of a plurality of focal regions for a camera at a first focal length, determine, from the first intensity measurements, a first focus value for each of the plurality of focal regions, generate a depth map of an indication of focal lengths for the plurality of focal regions based on the first focus values for the plurality of focal regions, and use the depth map in determining when to perform or in performing an autofocus operation for the camera.

In another example, a method is disclosed. The example method includes receiving a first intensity measurement for each of a plurality of focal regions for a camera at a first focal length, determining, from the first intensity measurements, a first focus value for each of the plurality of focal regions, generating a depth map of an indication of focal lengths for the plurality of focal regions based on the first focus values for the plurality of focal regions, and using the depth map in determining when to perform or in performing an autofocus operation for the camera.

In a further example, a non-transitory computer-readable medium is disclosed. The non-transitory computer-readable medium may store instructions that, when executed by a processor, cause a device to perform operations including receiving a first intensity measurement for each of a plurality of focal regions for a camera at a first focal length, determining, from the first intensity measurements, a first focus value for each of the plurality of focal regions, generating a depth map of an indication of focal lengths for the plurality of focal regions based on the first focus values for the plurality of focal regions, and using the depth map in determining when to perform or in performing an autofocus operation for the camera.

In another example, a device is disclosed. The device includes means for receiving a first intensity measurement for each of a plurality of focal regions for a camera at a first focal length, means for determining, from the first intensity measurements, a first focus value for each of the plurality of focal regions, means for generating a depth map of an indication of focal lengths for the plurality of focal regions based on the first focus values for the plurality of focal regions, and means for using the depth map in determining when to perform or in performing an autofocus operation for the camera.

Other aspects of the present disclosure relate to systems and methods for performing an autofocus operation. An example device may include one or more processors and a memory. The memory may include instructions that, when executed by the one or more processors, cause the device to determine a focus value for each of a plurality of focal regions for a camera set to a focal length, and determine, based on the focus values, one or more focal regions of the plurality of focal regions to exclude from use in triggering or performing an autofocus operation.

The instructions, when executed by the one or more processors, may further cause the device to determine whether to trigger the autofocus operation, including excluding the one or more determined focal regions from being used in determining whether to trigger the autofocus operation.

The instructions, when executed by the one or more processors, may further cause the device to determine a second focus value for each of the plurality of focal regions not excluded for the camera set to the focal length, determine, based on the focus values for the plurality of focal regions not excluded and the second focus values, whether a scene in a field of capture of the camera has changed, and trigger the autofocus operation when determined that the scene has changed.

The instructions, when executed by the one or more processors, may further cause the device to determine a first overall focus value from the focus values for the plurality of focal regions not excluded, determine a second overall focus value from the second focus values, and compare the first overall focus value to the second overall focus value, wherein determining whether the scene has changed is based on the comparison.

The instructions, when executed by the one or more processors, may further cause the device to determine, for a focal region, a focal length at which a corresponding portion of a scene in a field of capture of the camera is in focus, and compare the determined focal length to a reference focal length, wherein determining whether to exclude the focal region is based on the comparison. A focus value for the focal length at which the corresponding portion of the scene captured by the camera is in focus may be a highest contrast of contrasts for a plurality of focal lengths of the camera or a phase difference closest to zero of phase differences for the plurality of focal lengths of the camera.

The instructions, when executed by the one or more processors, may further cause the device to generate a depth map of focal lengths for the plurality of focal regions, wherein the determining of one or more focal regions to exclude is based on focal lengths in the generated depth map.

The instructions, when executed by the one or more processors, may further cause the device to exclude the one or more determined focal regions from being used in performing an autofocus operation, and perform the autofocus operation, including using the plurality of focal regions not excluded to determine a new focal length for the camera.

In another example, a method is disclosed. The example method includes determining a focus value for each of a plurality of focal regions for a camera set to a focal length, and determining, based on the focus values, one or more focal regions of the plurality of focal regions to exclude from use in triggering or performing an autofocus operation.

In a further example, a non-transitory computer-readable medium is disclosed. The non-transitory computer-readable medium may store instructions that, when executed by a processor, cause a device to perform operations including determining a focus value for each of a plurality of focal regions for a camera set to a focal length, and determining, based on the focus values, one or more focal regions of the plurality of focal regions to exclude from use in triggering or performing an autofocus operation.

In another example, a device is disclosed. The device includes means for determining a focus value for each of a plurality of focal regions for a camera set to a focal length, and means for determining, based on the focus values, one or more focal regions of the plurality of focal regions to exclude from use in triggering or performing an autofocus operation.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 4A is a depiction of an example camera lens at a focal length so that an object is in focus for contrast detection AF.

FIG. 4B is a depiction of an example camera lens at too long of a focal length so that the object is out of focus for contrast detection AF.

FIG. 4C is a depiction of an example camera lens at too short of a focal length so that the object is out of focus for contrast detection AF.

DETAILED DESCRIPTION

Figure 1:
FIG. 1 is a depiction of an example scene to be captured by a camera.

Aspects of the present disclosure may be used for determining whether to trigger an AF operation or for performing an AF operation. Aspects of the present disclosure also may be used for generating depth maps for a scene. In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras (including no cameras, where a separate device is used for capturing images or video which are provided to the device), and are therefore not limited to devices having one camera. Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

For some AF operations for a camera, the position of a camera lens may be automatically determined to place a portion of the scene in focus for the camera. In one example, a device may display a preview of the scene from the camera and a user may touch or otherwise indicate an area of the preview to indicate the portion of the scene to be in focus for the camera. In another example, the device may automatically determine a portion of the scene to be in focus. In response, the device may perform an AF operation to adjust the camera lens position so that the portion of the scene is in focus for subsequent image captures by the camera.

FIG. 1 is a depiction of an example scene 100 to be captured by a camera. As shown, different portions of the scene are at different distances or depths from the camera. If a portion of the scene at one depth is to be in focus for the camera, other portions of the scene may be out of focus in an image provided by the camera. For example, if the pier near the camera is to be in focus, the boat on the right, the remaining portions of the pier, and the buildings and coast toward the horizon may be out of focus.

A device may trigger an AF operation if the device senses or determines that the scene has changed. In one example of scene change, the camera may move so that the entire scene in the camera's field of capture changes (called a global motion). In a further example of scene change, an object may move in the scene or obstruct a portion of the scene (called a local motion). Examples of local motion include a person walking in front of the camera, a user's finger covering a portion of the camera lens or camera aperture to the camera sensor, and so on.

However, some local motions may not impact a region of interest (ROI) or region that is of interest to a user. For example, referring back to FIG. 1, the ROI may be the portion of the pier closest to the camera. As a result, the focal length for the camera may be set for the ROI. If a finger or object covers the top left portion of a camera sensor (even if not covering the portion of the sensor corresponding to the ROI), the device may determine that the scene has changed and retrigger an AF operation. As a result, the focal length may again be determined and set. While the focal length is being determined and set, a user may be prevented from using the camera to capture an image. Additionally, a user may notice the retriggered AF operation from a preview. For example, an AF operation may include changing the focal length to search for a final focal length. In this manner, a portion of the scene in a preview stream may go in and out of focus during the AF operation, or the preview may be otherwise temporarily interrupted. Unnecessarily triggering an AF operation may therefore negatively impact a user experience.

Types of AF operations include contrast detection (CD) and phase difference (PD) (CDAF and PDAF, respectively). For PDAF, a camera sensor may include photodiodes distributed across the camera sensor, with each photodiode being used to measure an intensity of the light received by the photodiode. The light intensity may be measured as a luminance or another means of measuring brightness. One example camera sensor is a dual photodiode (2PD) sensor, where each pixel of the camera sensor includes two photodiodes. Other example camera sensors are sensors with a sparser distribution of photodiodes than a 2PD sensor. For example, a 2×1 sensor may include a photodiode for every 2×2 patch of pixels of the camera sensor, a 4×1 sensor may include a photodiode for every 4×4 patch of pixels of the camera sensor, and so on.

In performing PDAF, two instances of the light emitted from an object in the scene being captured passes through different portions of a camera lens of a camera. The camera lens refracts the instances of light to the camera sensor, and the camera sensor senses or receives the refracted light. If the two instances of light align on the camera sensor after passing through the camera lens, the scene is determined to be in focus for image capture. If the two instances hit the camera sensor at different locations, the scene is determined to be out of focus. For example, the distribution of photodiodes is used to measure the luminances of the received light, and the measured luminances are analyzed to determine where the two instances hit the camera sensor.

Figure 2B:
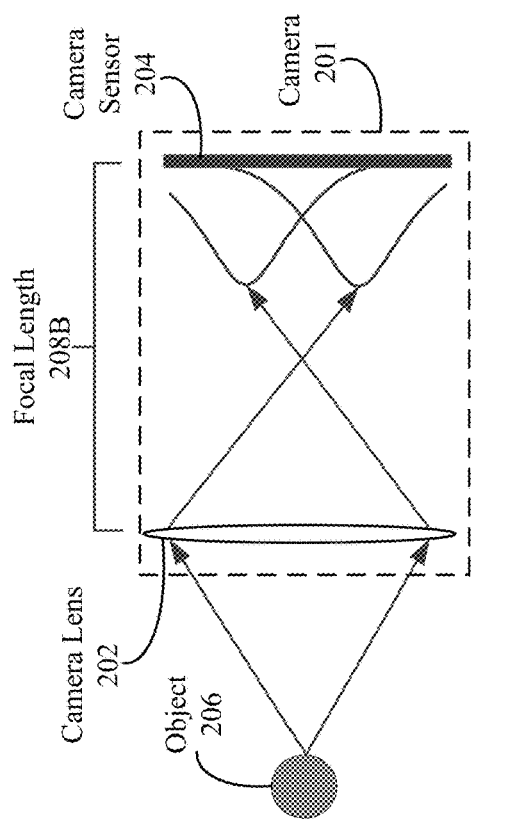
FIG. 2B is a depiction of an example camera lens at too long of a focal length so that the object is out of focus for phase difference AF.
Figure 2C:
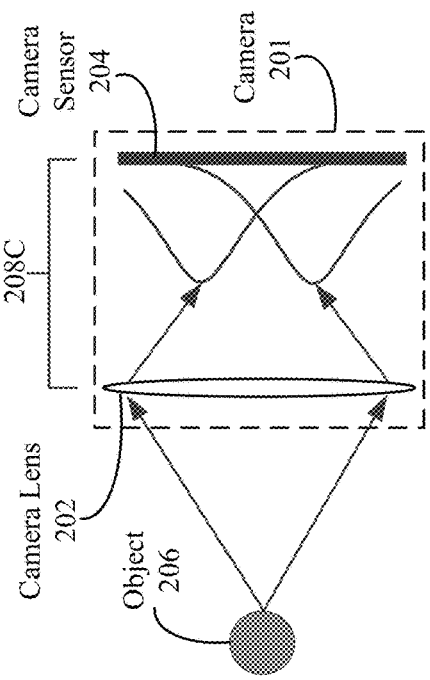
FIG. 2C is a depiction of an example camera lens at too short of a focal length so that the object is out of focus for phase difference AF.
Figure 2A:
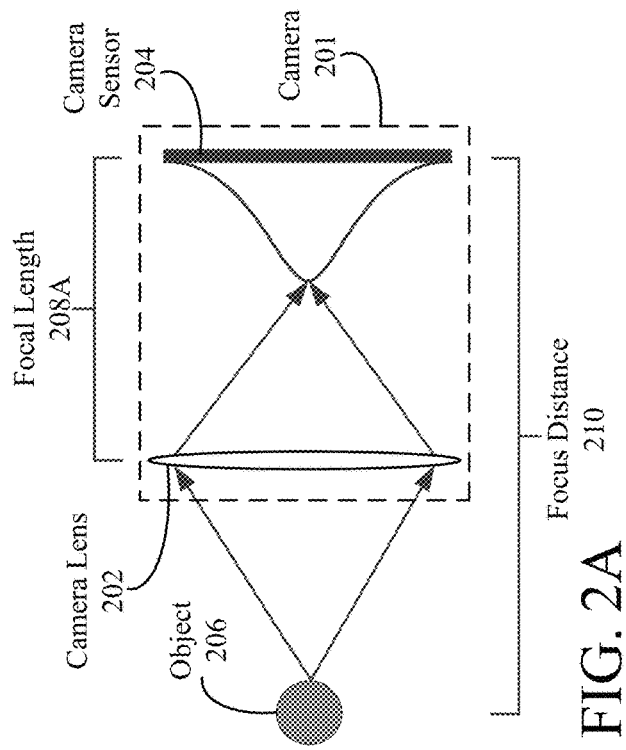
FIG. 2A is a depiction of an example camera lens at a focal length so that an object is in focus for phase difference AF.

FIG. 2A is a depiction of a camera 201 with a camera lens 202 at a focal length 208A (from the camera sensor 204) so that an object 206 is in focus at focus distance 210. FIG. 2B is a depiction of the camera 201 with the camera lens 202 at too long of a focal length 208B so that an object 206 is out of focus. FIG. 2C is a depiction of the camera 201 with the camera lens 202 at too short of a focal length 208C so that an object 206 is out of focus. The illustrated bumps indicate the distribution of measured luminance of the instances of light refracted by the camera lens 202 and received by the photodiodes located at different places of the camera sensor 204. As shown, the camera lens 202 refracts the instances of light from the object 206 to the camera sensor 204. If the distributions of measured luminance (illustrated as bumps) do not align, the object 206 is out of focus for images captured using the focal length (such as in FIG. 2B and FIG. 2C). If the distributions of measured luminance align, the object 206 is in focus for images captured using the focal length (such as in FIG. 2A). In some example implementations, the camera includes an actuator (not shown) to move the camera lens 202 toward or away from the camera sensor 204, thus adjusting the focal length (and therefore the focus distance).

The PD may be a distance in camera sensor pixels between the two instances hitting the camera sensor 204. In FIG. 2A, the PD is zero because the two instances align on the camera sensor 204. In FIGS. 2B and 2C, the PD is greater than and less than zero, respectively, since the two instances do not align on the camera sensor 204. The focal length is linearly correlated to the PD.

Figure 3:
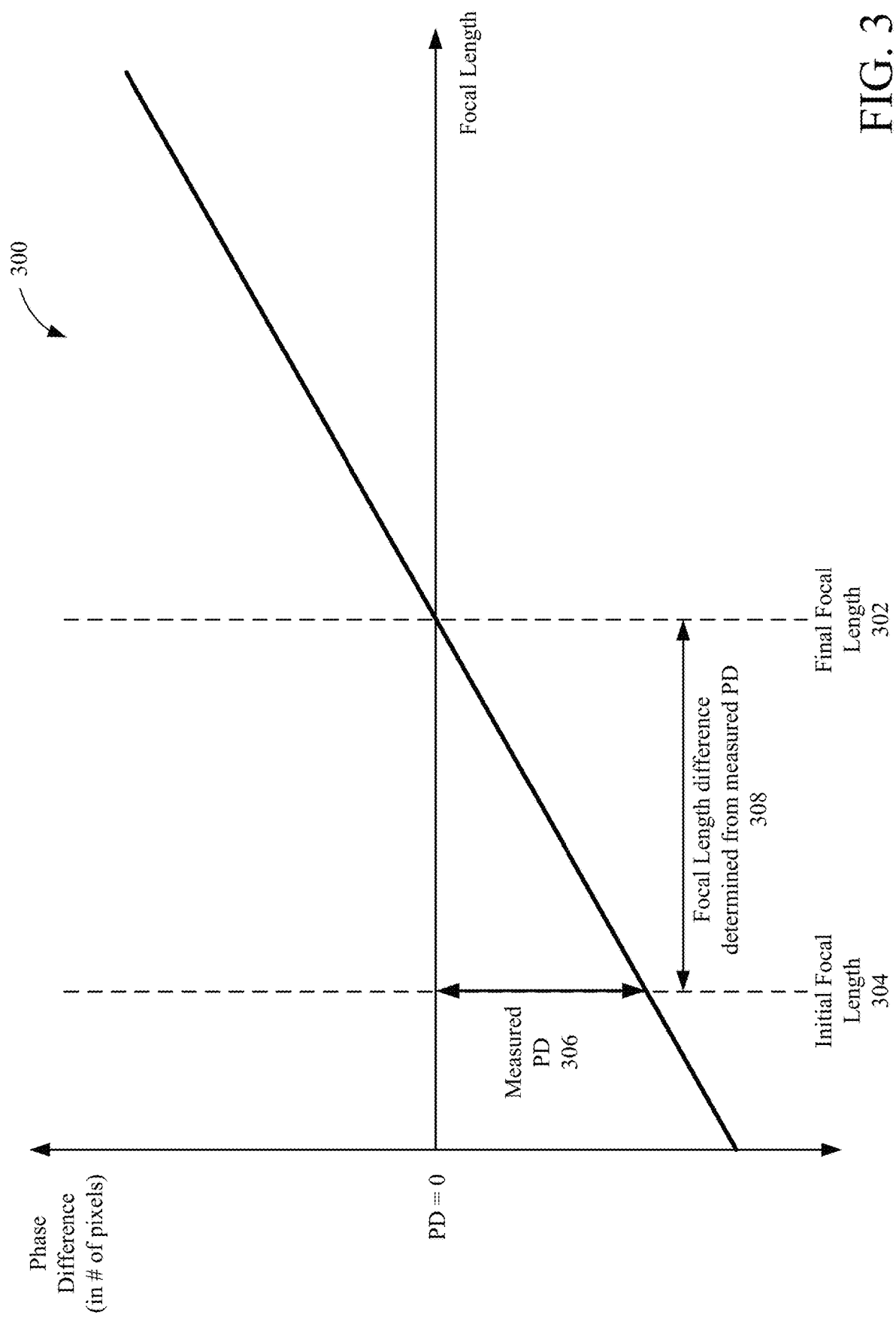
FIG. 3 is a depiction of an example correlation between focal length and phase difference for phase difference AF.

FIG. 3 is a depiction 300 of an example correlation between focal length and PD for PDAF. The correlation between the PD and focal length may be known, such as the rate of change (slope of the line). A final focal length 302 is the focal length corresponding to the measured PD being zero. The camera lens position may be adjusted from the initial or current focal length 304 toward the final focal length 302 to place an object or portion of the scene in focus. If the PD 306 is measured for an initial focal length 304, the focal length difference 308 from the final focal length 302 may be determined from the known rate of change (slope of the line) and the initial focal length 304 (corresponding to the offset of the line). The camera lens position may then be adjusted approximately by the focal length difference 308.

While the above examples for PDAF are regarding photodiodes dispersed across the camera sensor, other ways for performing PDAF may be used. For example, a mirror may be used to reflect the refracted light toward a camera sensor. Holes in the mirror may allow some light to pass through to a separate light sensor. The separate light sensor may be an array of photodiodes, a one-dimensional or two-dimensional strip of photosensitive pixels (such as in a charge-coupled device), and so on. The separate light sensor is used in measuring a PD, and the camera sensor is used in capturing an image. Therefore, the present disclosure should not be limited to a specific example of PDAF.

Another type of AF operation is CDAF. For CDAF, a contrast is determined using the camera sensor without using a separate light sensor or photodiodes. The contrast is a difference in measured light intensity (such as luminance) between neighboring pixels of the camera sensor.

FIG. 4A is a depiction of a camera 401 with a camera lens 402 at a focal length 408A (from the camera sensor 404) so that an object 406 is in focus at focus distance 410. FIG. 4B is a depiction of the camera 401 with the camera lens 402 at too long of a focal length 408B so that an object 406 is out of focus. FIG. 4C is a depiction of the camera 401 with the camera lens 402 at too short of a focal length 408C so that an object 406 is out of focus. The illustrated bumps indicate the distribution of measured luminance of light from the object 406 and refracted by the camera lens 402 toward the camera sensor 404. An object 406 is considered in focus when the distribution is tighter (such as a smaller standard deviation) than the distributions for the other focal lengths. As shown, the object 406 is out of focus when the distribution of measured light intensity for the object is spread out compared to the distribution for the focal length when the object is in focus. In this manner, the difference in light intensity for light from the object 406 received by neighboring pixels of the camera sensor 404 is greatest when the object 406 is in focus (the slope of the curve is greatest when the object 406 is in focus). For example, when an object is out of focus, an image of the object appears blurry, and the difference in light intensity between pixels (contrast) is less than when the object is in focus. While contrast is described as a difference in light intensity between neighboring pixels, contrast may be a difference in chrominance or a difference in some combination of chrominance and light intensity, and the present disclosure should not be limited to specific examples of contrast or CDAF.

Figure 5:
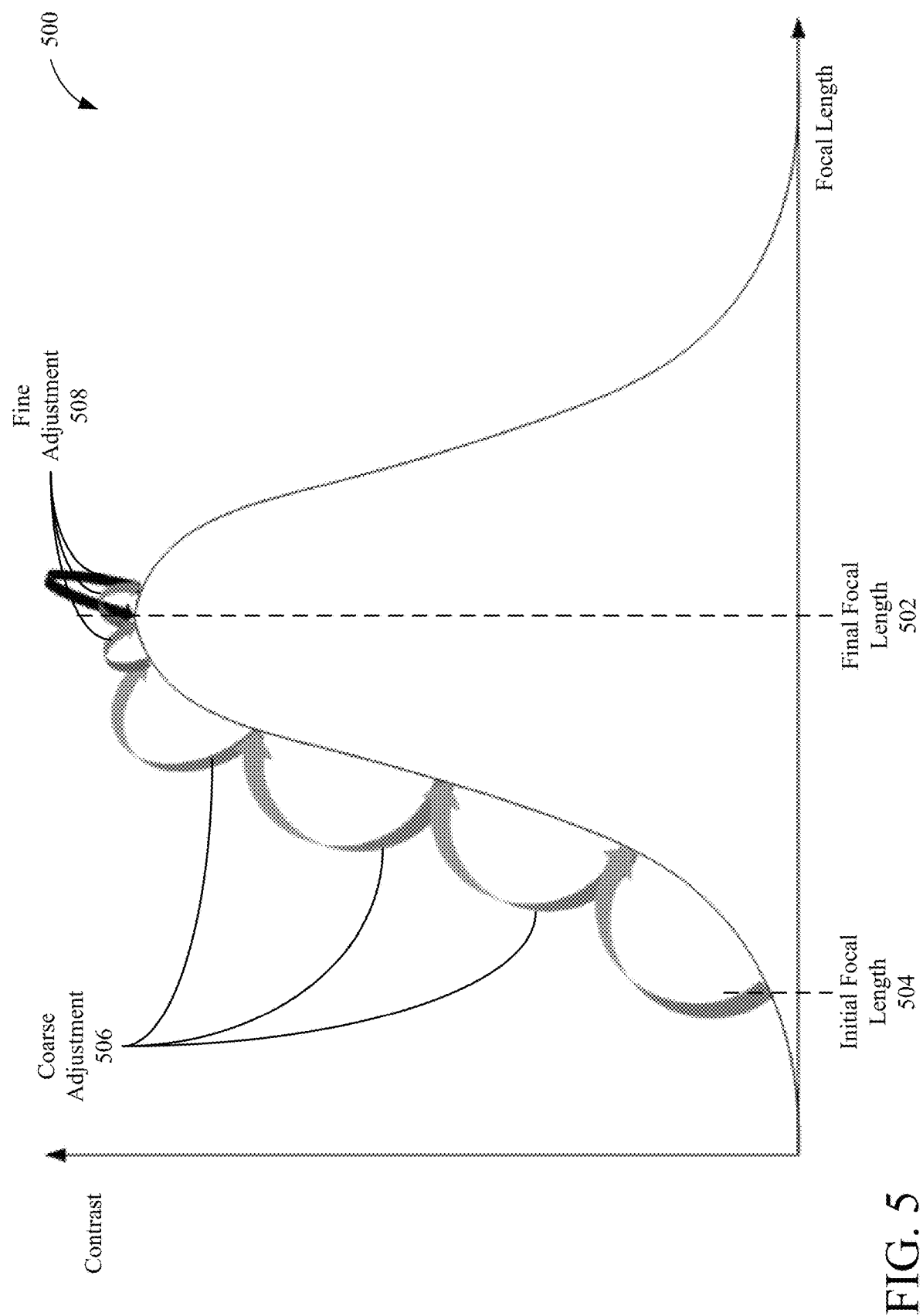
FIG. 5 is a depiction of an example correlation between focal length and contrast for contrast detection AF.

FIG. 5 is a depiction 500 of an example correlation between focal length and contrast for CDAF. As shown, the correlation between focal length and contrast is parabolic/second order. The exact curvature may differ, and the depiction 500 is for illustrative purposes only. For example, the correlation may be expressed in general by a second order equation $y=ax^2+bx+c$, where the contrast is y, the focal length is x, the curvature of the parabola is indicated by a, the slope of the parabola is indicated by b, and the offset of the parabola is indicated by c. The final focal length 502 for which the object is in focus corresponds to the contrast being at a maximum compared to the contrasts for other focal lengths (the vertex of the parabola). For example, the vertex may be $-b/2a$ for the above second order equation.

For CDAF, the focal length is adjusted and the contrast determined until the final focal length 502 is found. For example, one or more coarse adjustments 506 to the focal length from the initial focal length 504 may be performed until reaching a focal length within a threshold of the final focal length 502. A coarse adjustment 506 is an adjustment to the focal length of the camera that is greater than a fine adjustment 508. Coarse adjustments and fine adjustments may be fixed or variable in size, pre-configured or configurable, or any other suitable types of focal length adjustments for CDAF, and the present disclosure should not be limited to a specific example of adjustments to the focal length.

In searching for or converging to the final focal length 502, a coarse adjustment 506 may be performed if the difference between a previous contrast and a current contrast is increasing or steady to previous distances and/or the difference is greater than a threshold. Conversely, the difference between the previous contrast and the current contrast decreasing and/or the difference being less than a threshold may indicate that the current focal length is within a threshold of the final focal length, and another coarse adjustment 506 may not be performed. Then, one or more fine adjustments 508 may be performed until converging to the final focal length 502. As a result, CDAF is an iterative process of measuring the contrast, adjusting the focal length, and again measuring the contrast until a final focal length 502 is determined.

The present disclosure uses the term "focus value" to include contrast and PD. For example, determining a focus value to place an object in focus may include determining a highest or greatest contrast or determining a PD closest to zero (which may be considered a "lowest PD" or a "smallest PD"). A focus value may also be any other suitable determination or measurement in determining a focal length or whether an object is in focus, and the present disclosure should not be limited to a specific example of a focus value.

Figure 6:
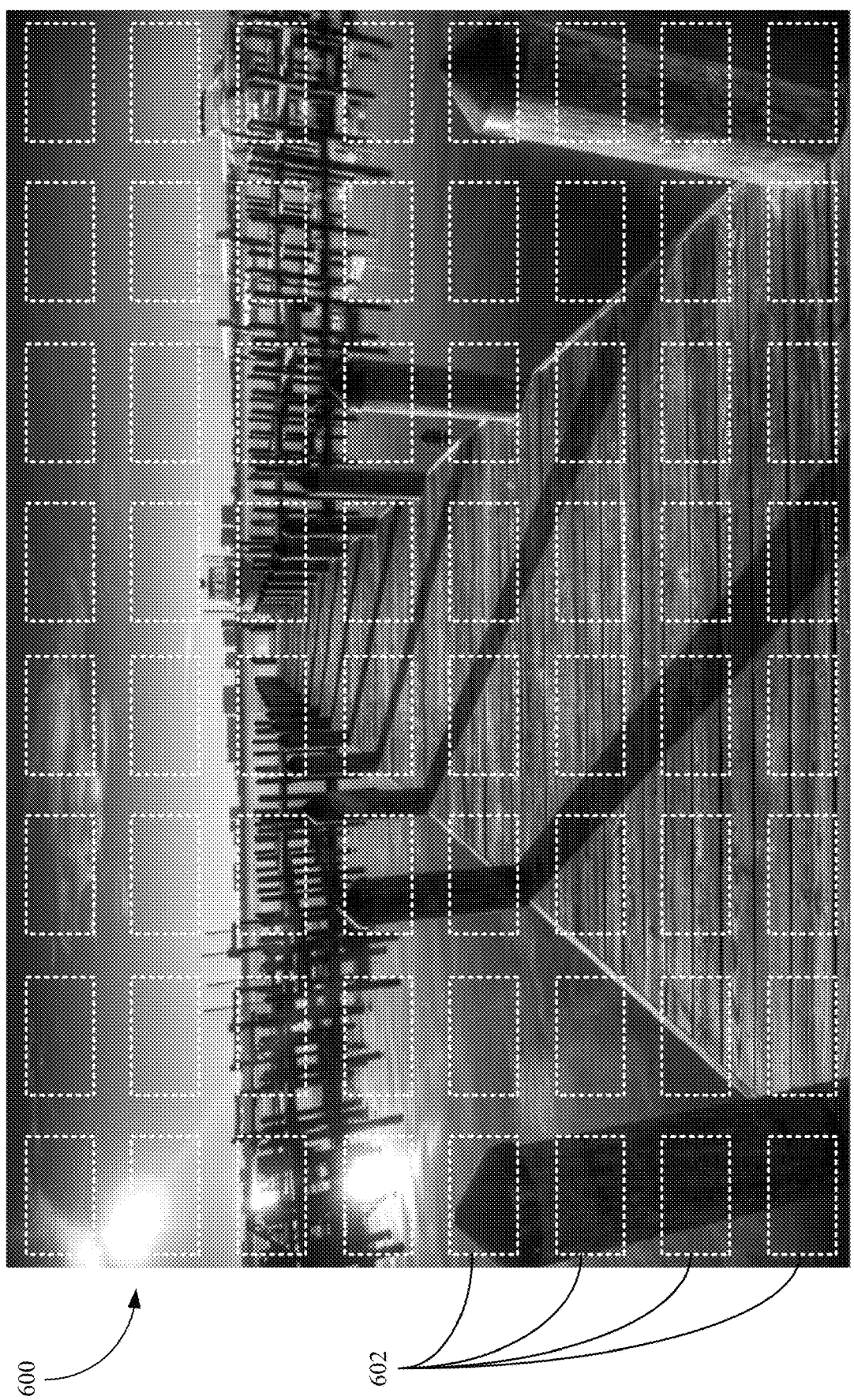
FIG. 6 is a depiction of an example image of the scene in FIG. 1.

After a focal length is determined for a camera (such as by PDAF or CDAF), a device may retrigger an AF operation if the device determines that the scene in the camera's field of capture has changed. A "focal region" for a camera is a portion of the scene as captured by the camera and to be used in determining a focus value. The focal region may be a portion of the camera sensor, which may be static or defined by the camera. A camera or camera sensor may include multiple focal regions. In determining that a scene has changed, the device may measure a focus value for each focal region. For example, FIG. 6 is a depiction of an example image of the scene 600 (such as scene 100 in FIG. 1). The device may determine a focus value for focal regions of the camera sensor or a light sensor that capture the portions 602 of scene 600. For CDAF, the information from the camera sensor pixels corresponding to a portion 602 may be used to determine a focus value for the corresponding focal region. For PDAF, the information from the photodiodes corresponding to the focal region of the camera sensor capturing the portion 602 may be used to determine a focus value. As shown, the portions 602 and corresponding focal regions may be rectangles evenly distributed across the camera sensor or light sensor. However, the portions and/or focal regions may be of any dimension, number, and distribution.

In some implementations of determining whether a scene is changing so to trigger an AF operation, the device may determine if a threshold number of portions 602 are changing. For example, the device may store a reference focus value for each focal region corresponding to the portions 602. The reference focus value may be the focus value determined for the focal region when the focal length was last set (such as during the previous AF operation). In determining whether a focal region changes, the device may compare a difference between a current focus value and the reference focus value to a threshold (which may be any suitable value, including zero). The device may determine that the focal region changes when the difference is greater than the threshold.

In another implementation of determining a scene change, the device may determine whether an overall focus measurement or value for an image is changing between images. The device may determine an overall focus value from the focus values determined for each of the focal regions (such as the focal regions associated with portions 602 in FIG. 6). For example, the overall focus value for the image may be an average focus value, a summation of the focus values, a median focus value, and so on. The device may then compare the determined overall focus value for the current image to the overall focus value for a previous image (such as a reference overall focus value). The previous image may be the directly previous image received by the device (or captured by the camera) or another previous image (such as the image received by the device or captured by the camera when the focal length was last set for the camera). If the difference between overall focus values is greater than a threshold, the device may determine that the scene has changed to trigger an AF operation.

While the examples describe comparing overall focus values for different images, images may not need to be captured to determine an overall focus value. For example, the photodiodes or light sensor for PDAF may operate independently of the camera sensor. As a result, the photodiodes or light sensor may measure light intensities without the camera sensor capturing an image. Therefore, the measuring focus values or overall focus values between images may also include measuring focus values that are determined without capturing corresponding images.

The ROI or region of importance to a user may not be affected by the scene change. For example, one or more portions 602 of the scene may be affected by an object blocking a portion of the camera sensor (such as a finger covering a corner, an object entering the edge of the field of capture for the camera, and so on), but the portion of the camera sensor being blocked or affected may not correspond to the portions 602 associated with an ROI.

Figure 7:
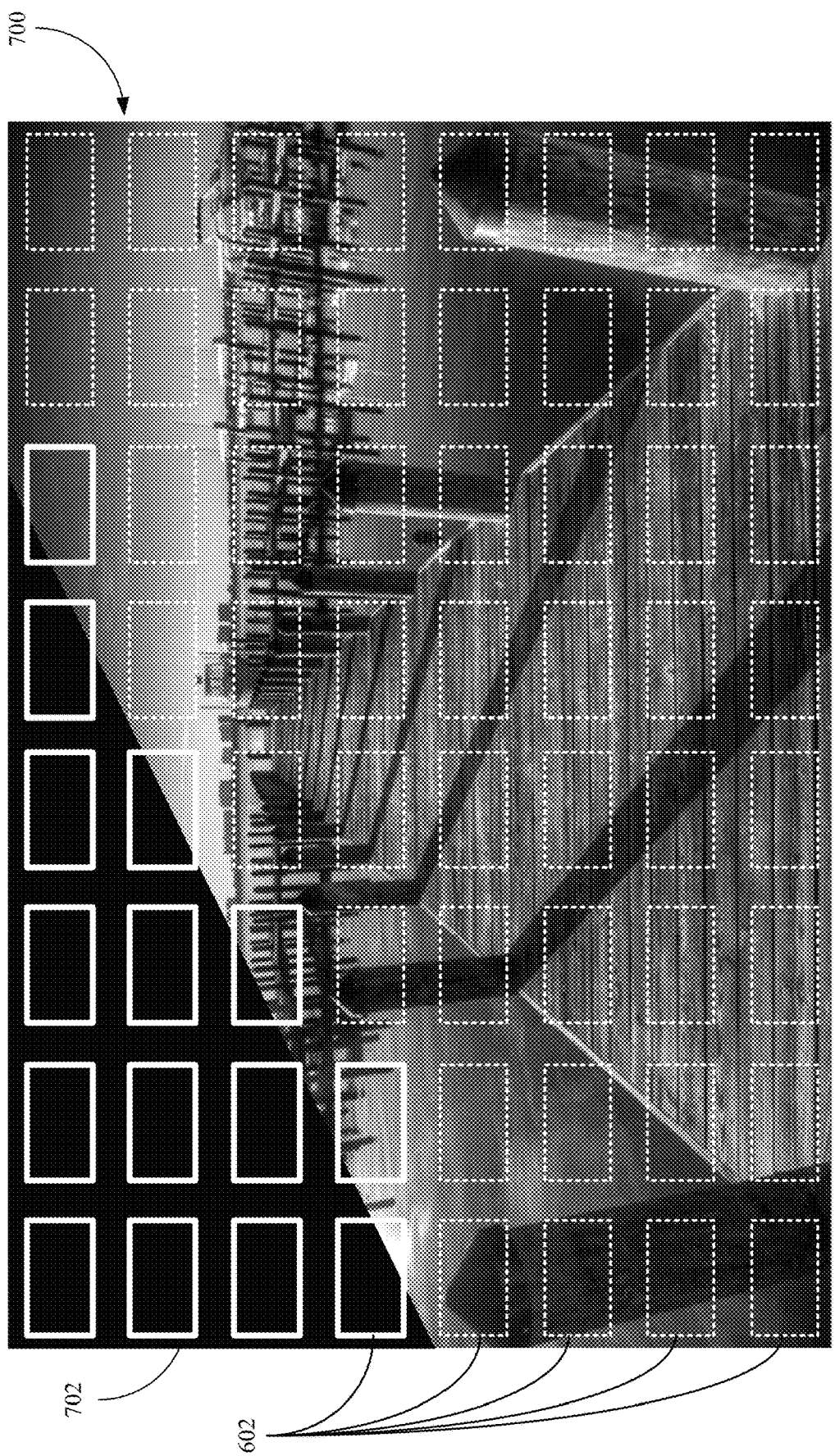
FIG. 7 is a depiction of an example image of the scene in FIG. 1 with a portion of the scene blocked.
Figure 8:
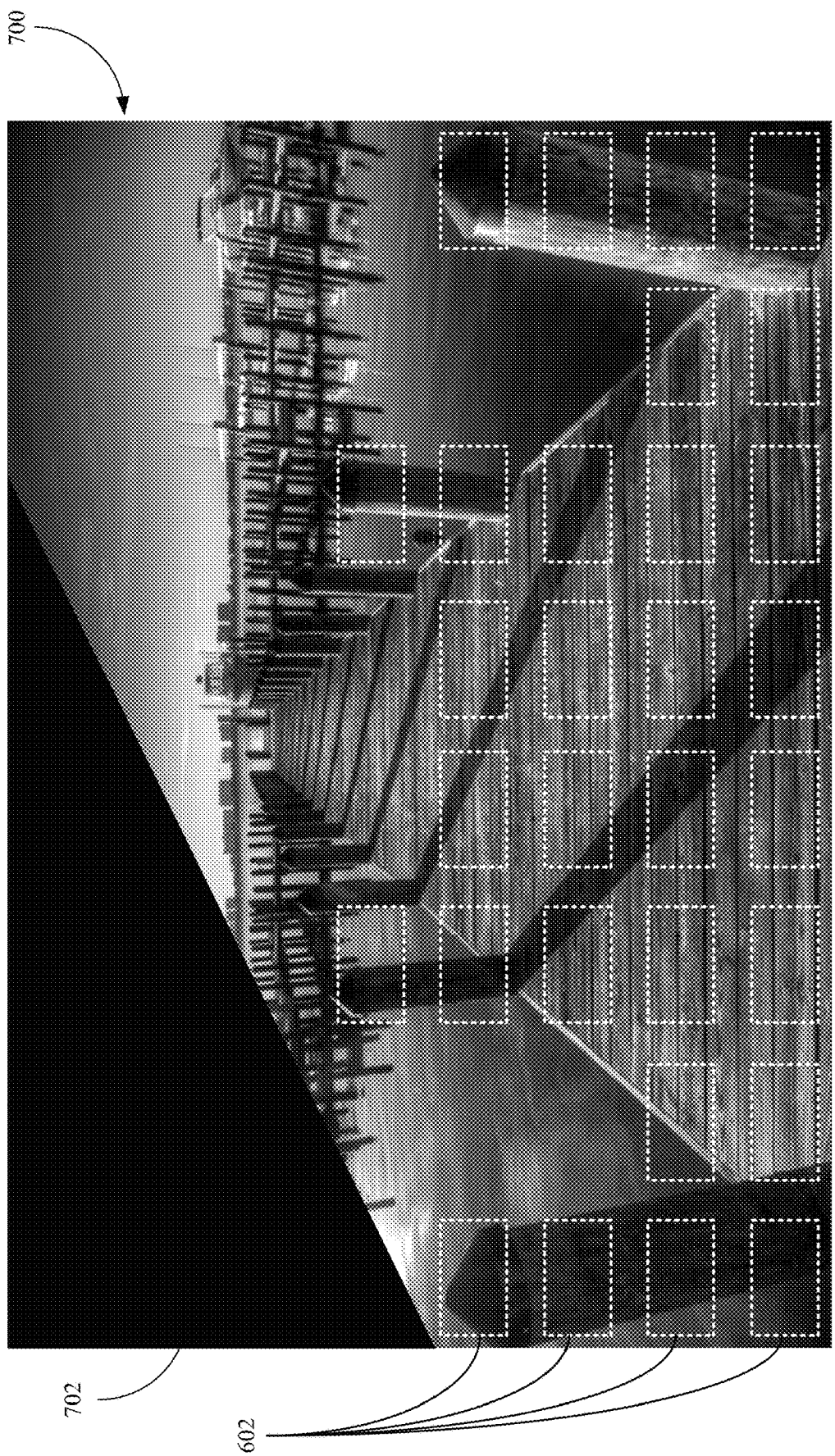
FIG. 8 is a depiction of the example image in FIG. 7 and illustrating the portions for determining a focus value corresponding to an example region of interest in the scene.

For example, FIG. 7 is a depiction of an example image 700 of the scene 100 in FIG. 1 with a portion 702 of the scene blocked. The portion 702 being blocked may be as a result of a finger covering a portion of the camera lens or an object entering the field of capture for the camera. The portions 602 that are highlighted are affected, and a device may determine that the highlighted portions are changed (such as described above). If the number of highlighted portions is greater than a threshold, the device may determine to retrigger an AF operation to determine a focal length for the camera. Alternatively, if an overall focus value changes more than a threshold from a previous overall focus value, the device may determine to retrigger an AF operation to determine a focal length for the camera. If the pier closest to the camera is the ROI, the highlighted portions may not be the portions associated with the ROI. FIG. 8 is a depiction of the example image 700 and illustrating the portions 602 corresponding to an example ROI of the scene (the pier closest to the camera). As shown, the portion 702 of the scene blocked does not affect the portions 602 corresponding to the example ROI in the scene.

In some example implementations, a device may exclude one or more focal regions (where each focal region may correspond to, e.g., one of the portions 602) for use in determining whether to trigger an AF operation. Additionally or alternatively, the device may exclude one or more focal regions for use in performing an AF operation (such as determining a focal length). In determining which focal regions to exclude, the device may generate a depth map. For example, the device may generate a depth map of focal lengths for the focal regions corresponding to portions 602.

Figure 9:
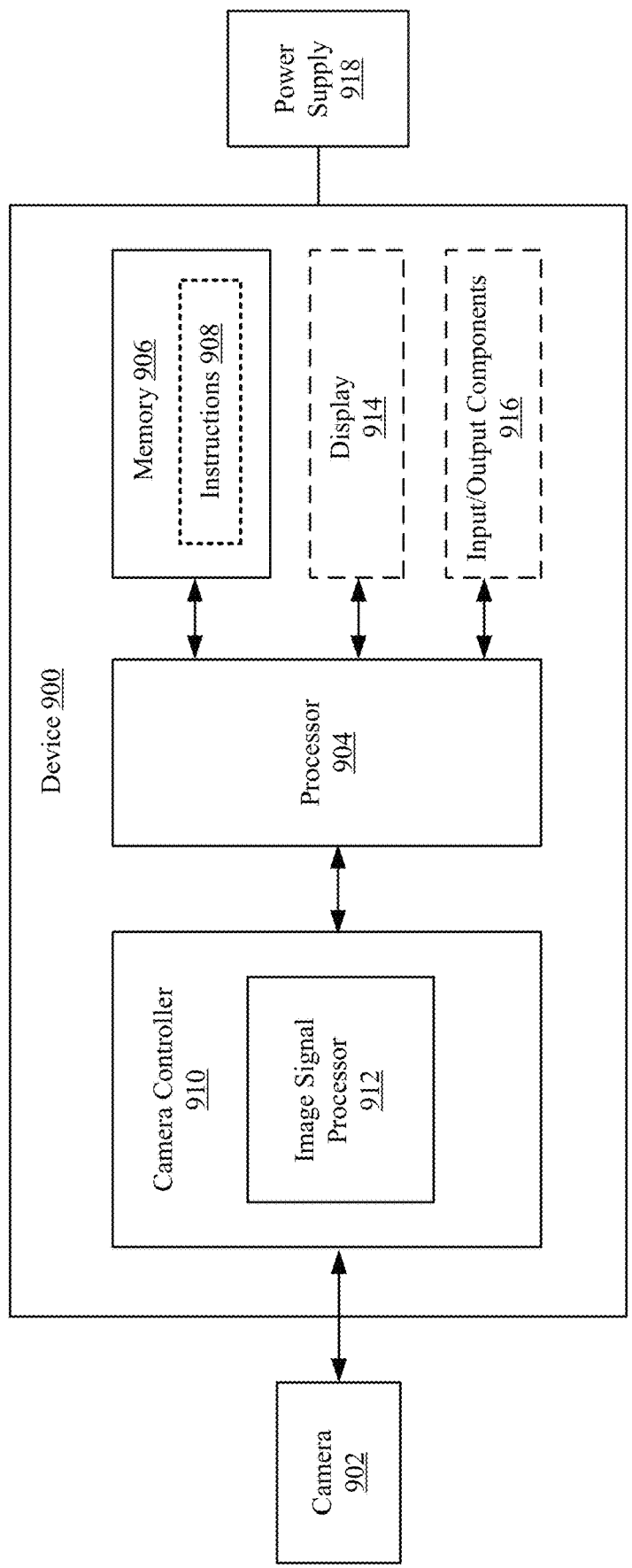
FIG. 9 is a block diagram of an example device for determining when to perform an AF operation, performing an AF operation, and/or generating a depth map.

FIG. 9 is a block diagram of an example device 900 for determining when to perform an AF operation, performing an AF operation, and/or generating a depth map. The example device 900 may include or be coupled to a camera 902, a processor 904, a memory 906 storing instructions 908, and a camera controller 910. The device 900 may optionally include (or be coupled to) a display 914 and a number of input/output (I/O) components 916. The device 900 may include additional features or components not shown. For example, a wireless interface, which may include a number of transceivers and a baseband processor, may be included for a wireless communication device. The device 900 may include or be coupled to additional cameras other than the camera 902. The disclosure should not be limited to any specific examples or illustrations, including the example device 900.

The camera 902 may be an example of the camera 201 in FIGS. 2A-2C or the camera 401 in FIGS. 4A-4C. The camera 902 may be capable of capturing individual image frames (such as still images) and/or capturing video (such as a succession of captured image frames). The camera 902 may include a single camera sensor, or be a dual camera module or any other suitable module with multiple camera sensors. The camera 902 may also include a separate light sensor or multiple photodiodes as part of the camera sensor. The memory 906 may be a non-transient or non-transitory computer readable medium storing computer-executable instructions 908 to perform all or a portion of one or more operations described in this disclosure. The device 900 may also include a power supply 918, which may be coupled to or integrated into the device 900.

The processor 904 may be one or more suitable processors capable of executing scripts or instructions of one or more software programs (such as instructions 908) stored within the memory 906. In some aspects, the processor 904 may be one or more general purpose processors that execute instructions 908 to cause the device 900 to perform any number of functions or operations. In additional or alternative aspects, the processor 904 may include integrated circuits or other hardware to perform functions or operations without the use of software. While shown to be coupled to each other via the processor 904 in the example of FIG. 9, the processor 904, the memory 906, the camera controller 910, the optional display 914, and the optional I/O components 916 may be coupled to one another in various arrangements. For example, the processor 904, the memory 906, the camera controller 910, the optional display 914, and/or the optional I/O components 916 may be coupled to each other via one or more local buses (not shown for simplicity).

The display 914 may be any suitable display or screen allowing for user interaction and/or to present items (such as captured images, video, or a preview image) for viewing by a user. In some aspects, the display 914 may be a touch-sensitive display. The I/O components 916 may be or include any suitable mechanism, interface, or device to receive input (such as commands) from the user and to provide output to the user. For example, the I/O components 916 may include (but are not limited to) a graphical user interface, keyboard, mouse, microphone and speakers, and so on. The display 914 and/or the I/O components 916 may provide a preview image to a user and/or receive a user input for adjusting one or more settings of the camera 902 (such as selecting and/or deselecting a ROI of the scene by touching a portion of a displayed preview image).

The camera controller 910 may include an image signal processor 912, which may be one or more image signal processors to process captured image frames or video provided by the camera 902. In some example implementations, the camera controller 910 (such as the image signal processor 912) may also control operation of the camera 902. In some aspects, the image signal processor 912 may execute instructions from a memory (such as instructions 908 from the memory 906 or instructions stored in a separate memory coupled to the image signal processor 912). In other aspects, the image signal processor 912 may include specific hardware. The image signal processor 912 may alternatively or additionally include a combination of specific hardware and the ability to execute software instructions.

Figure 10:
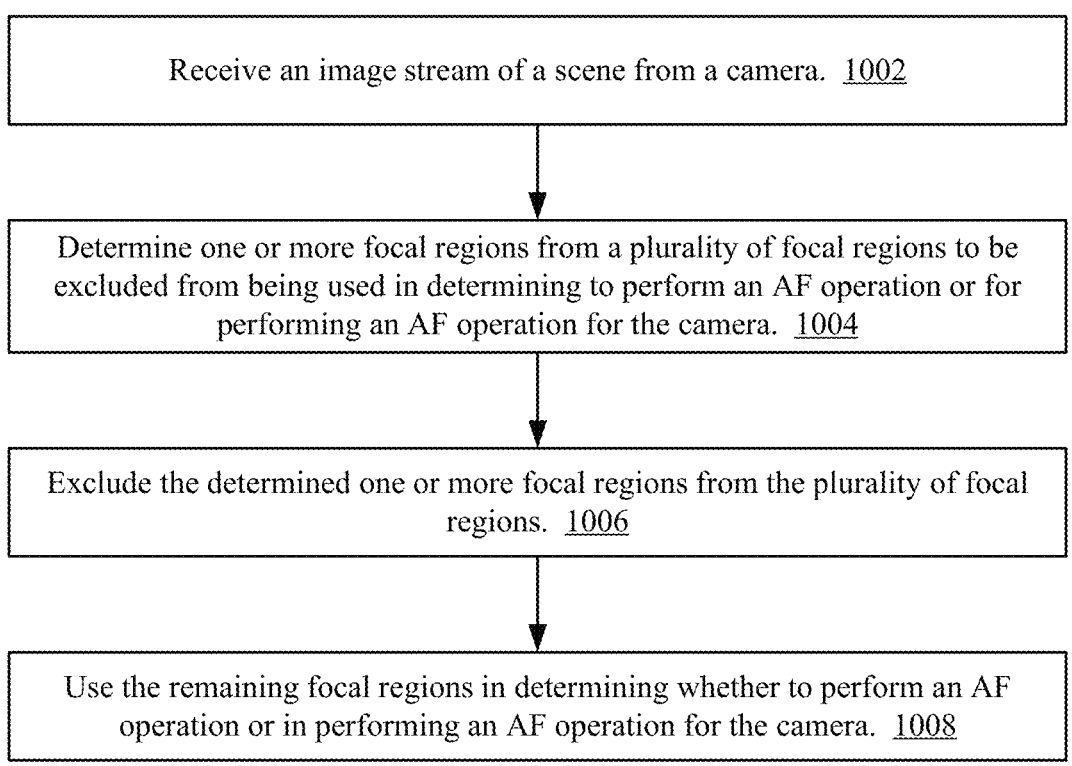
FIG. 10 is an illustrative flow chart depicting an example operation for excluding one or more focal regions for triggering and/or performing an AF operation for a camera.

As described above, the device 900 may use multiple focal regions (such as corresponding to portions 602 in FIG. 6) for use in determining whether to trigger an AF operation or for use in performing an AF operation for the camera 902. In some example implementations, the device 900 may exclude one or more focal regions when the portions of the scene corresponding to the focal regions (such as portions 602 in FIG. 6) are at different depths in the scene than a ROI or region of importance to a user. FIG. 10 is an illustrative flow chart depicting an example operation 1000 for excluding one or more focal regions (such as corresponding to one or more portions 602 in FIG. 6) for use in triggering and/or performing an AF operation for a camera 902. While the following examples are described in relation to the example device 900 and the camera 902, the example methods may be performed by devices or systems of other configurations and capabilities. For example, the camera 902 may be separate and communicably coupled to the device 900 (such as a security system with multiple cameras communicably coupled to a hub), the device 900 may be a smartphone or other electronic device, the device 900 may be a vehicle including one or more cameras for detecting scene changes, and so on. The following examples are for illustrative purposes, and the present disclosure should not be limited to any specific device (including device 900) or ways for performing aspects of the present disclosure.

Beginning at 1002, the device 900 may receive an image stream (including a sequence of images) of a scene from the camera 902. For example, the camera 902 may capture an image stream and provide the image stream to the camera controller 910. The device 900 may use the image stream and focal regions corresponding to portions of the image stream to determine one or more focal regions to be excluded from being used in determining to perform an AF operation or for performing an AF operation for the camera 902 (1004). For example, the device 900 may determine a ROI for the scene in the camera's field of capture (such as determining a ROI for a portion of the scene indicated by a user input, determining a ROI for an identified face in the scene, and so on). The device 900 may then determine to exclude any focal regions not associated with the ROI. In one example, a focal region may not be associated with the ROI if no portion of the focal region overlaps with any portion of the ROI. In another example, a focal region may not be associated with the ROI if the scene contents for the focal region are at a different depth than the scene contents for the ROI. The device 900 may then exclude the determined one or more focal regions (1006). For example, the device 900 may exclude focal regions corresponding to a subset of the portions 602 in FIG. 6 that are not associated with a ROI of the pier closest to the camera. The focal regions not excluded correspond to the remaining portions 602 in FIG. 8.

After one or more focal regions are excluded, the device 900 may use the remaining focal regions (the focal regions not excluded) in determining whether to perform/trigger an AF operation or for performing an AF operation for the camera 902 (1008). In some examples, the device 900 may determine whether a threshold of remaining focal regions is changing during a scene change (such as objects moving, blocking a portion of the camera sensor, or a global motion of the camera). If the threshold is reached, the device 900 may determine to trigger an AF operation. In some example implementations, since the remaining focal regions are associated with the ROI, the threshold may be lower than a threshold used for triggering an AF operation when no focal regions are excluded. In one example, the threshold may be one focal region, five percent of focal regions, or another suitable amount. In another example, if the threshold for triggering an AF operation is a ratio of the number of focal regions changing to the number of focal regions that are stable (not changing), the threshold for the remaining focal regions associated with the ROI may be the same ratio of the number of remaining focal regions changing to the number of remaining focal regions that are stable. As described above, a focal region may be changing if the focal region's associated focus value at different times differ by more than a threshold. A focal region may be stable if the difference between the focal region's associated focus values remains within a threshold.

In some other examples, the device 900 may determine an overall focus value from the focus values for the remaining focal regions (such as an average focus value, a median focus value, a summation of focus values, and so on). As a result, the excluded focal regions may not be used in determining the overall focus value. The device 900 may then compare the overall focus value to a previously determined overall focus value to determine if the difference between overall focus values is greater than a threshold. In some example implementations, the previously determined overall focus value may be a reference overall focus value, which may be an overall focus value determined when the focal length was last set for the camera 902 during a previous AF operation.

Referring back to FIG. 6 and FIG. 8 to illustrate determining to trigger an AF operation, since the object blocking the portion 702 of the scene does not affect the remaining portions 602 in FIG. 8, the number of focal regions (associated with portions 602 in FIG. 8) that are changing is zero (and does not reach a threshold for determining to trigger an AF operation). As a result, the device 900 may determine not to trigger an AF operation to adjust the focal length as a result of the blockage of the portion 702 of the scene.

In some example implementations of determining one or more focal regions to be excluded, the device 900 may determine a ROI and determine only the focal regions associated with the ROI not to be excluded. In some other example implementations, the device 900 may also determine not to exclude one or more focal regions surrounding the focal regions associated with the ROI. For example, if a center group of focal regions is associated with a ROI, the device 900 may determine not to exclude a layer of one focal region surrounding the center group of focal regions. As a result, the device 900 may be able to predict if an object/local motion is about to affect the center group of focal regions if one or more focal regions of the layer surrounding the center group are affected by the object.

Different portions of a scene may be in focus at the same focal length. For example, referring back to FIG. 6, the boat in the right side of the field of capture for the scene 600 and the pier on the left side of the field of capture for the scene may be in focus at the same focal length since they are similar depths from the camera. In some example implementations, the device 900 may determine which focal regions whose corresponding portion of the scene is in focus when the ROI is in focus. Also, the device 900 may determine whether any of the focal regions with corresponding scene portions overlapping at least a portion of the ROI has a different focus value than the other focal regions with corresponding scene portions overlapping at least a portion of the ROI. For example, the illustrated portions 602 in FIG. 8 may not include the water between the pier's post and the pier's floor on the bottom left and bottom right of the scene 600. As a result, the focal regions corresponding to the portions primarily including the water may be excluded.

In this manner, contiguous or non-contiguous groups of focal regions may correspond with different portions of the scene that is in focus at the same focal length. The device 900 may determine to exclude the focal regions whose corresponding portions of the scene are not in focus at the focal length for which the ROI is in focus. To determine one or more focal regions to be excluded from being used, the device 900 may generate and use a depth map for the focal regions, with some example implementations of a depth map described below. The depth map may provide an indication of a focal length for each focal region that the corresponding portion of the scene is in focus.

Figure 11:
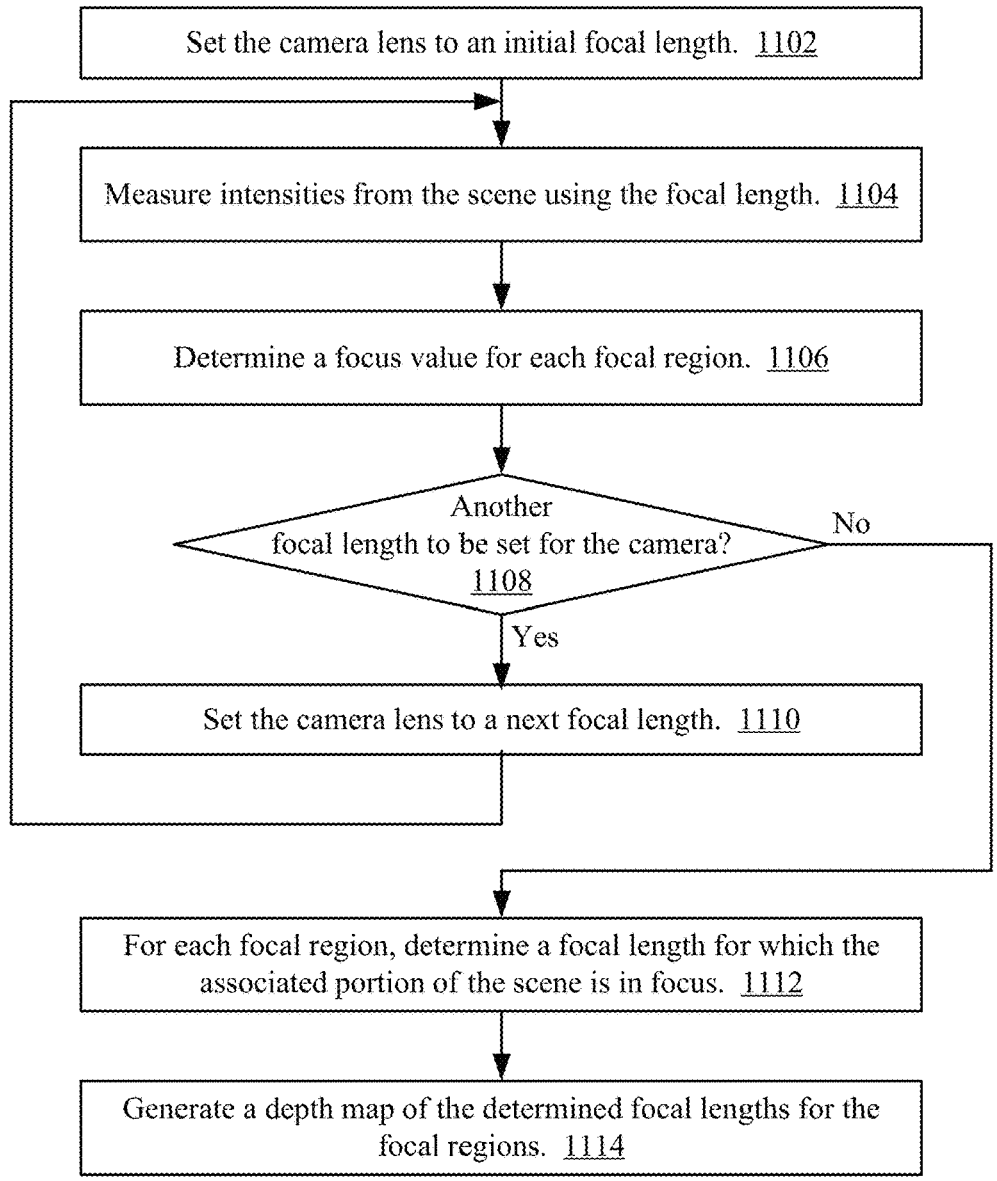
FIG. 11 is an illustrative flow chart depicting an example operation for generating a depth map.

FIG. 11 is an illustrative flow chart depicting an example operation 1100 for generating a depth map. In some example implementations, generating a depth map may be included in determining one or more focal regions to be excluded from being used in determining to perform an AF operation or for performing an AF operation (such as 1004 in FIG. 10). For example, the determined values in the depth map may be determined focus values or focal lengths of the camera for when a corresponding focal region is in focus. The device 900 may use the determined values in the depth map to exclude one or more focal regions (such as 1006 in FIG. 10). For example, a focal region may be excluded if the determined focus value or focal length is outside a predetermined distance from a reference focus value or focal length (such as described below regarding FIG. 18). In another example, a focal region may be excluded if the determined focus value or focal length is outside a predetermined distance from a focus value or focal length for a focal region determined to be used in triggering or performing an AF operation of the camera (such as described below regarding FIG. 17). The remaining (non-excluded) focal regions may then be used in determining when to perform an AF operation or in performing an AF operation.

Beginning at 1102, the device 900 may set the camera lens of the camera 902 to an initial focal length. In some example implementations, the initial focal length may be the smallest focal length or the largest focal length for the camera 902. In some other example implementations, the initial focal length may be the last used focal length or any other suitable focal length. After setting the initial focal length for the camera 902, the device 900 may measure intensities from the scene using the initial focal length (1104). The intensities may be light intensities, chrominance intensities, or another measured intensity. In one example, the device 900 may receive an image captured by a camera sensor, and the device 900 may use the image values (such as RGB or YUV values) at one or more points or one or more regions of the image to determine intensities in the scene captured in the image (such as determining one or more light intensities in the scene). In another example, the device 900 may use photodiodes to measure light intensities.

Figure 12:
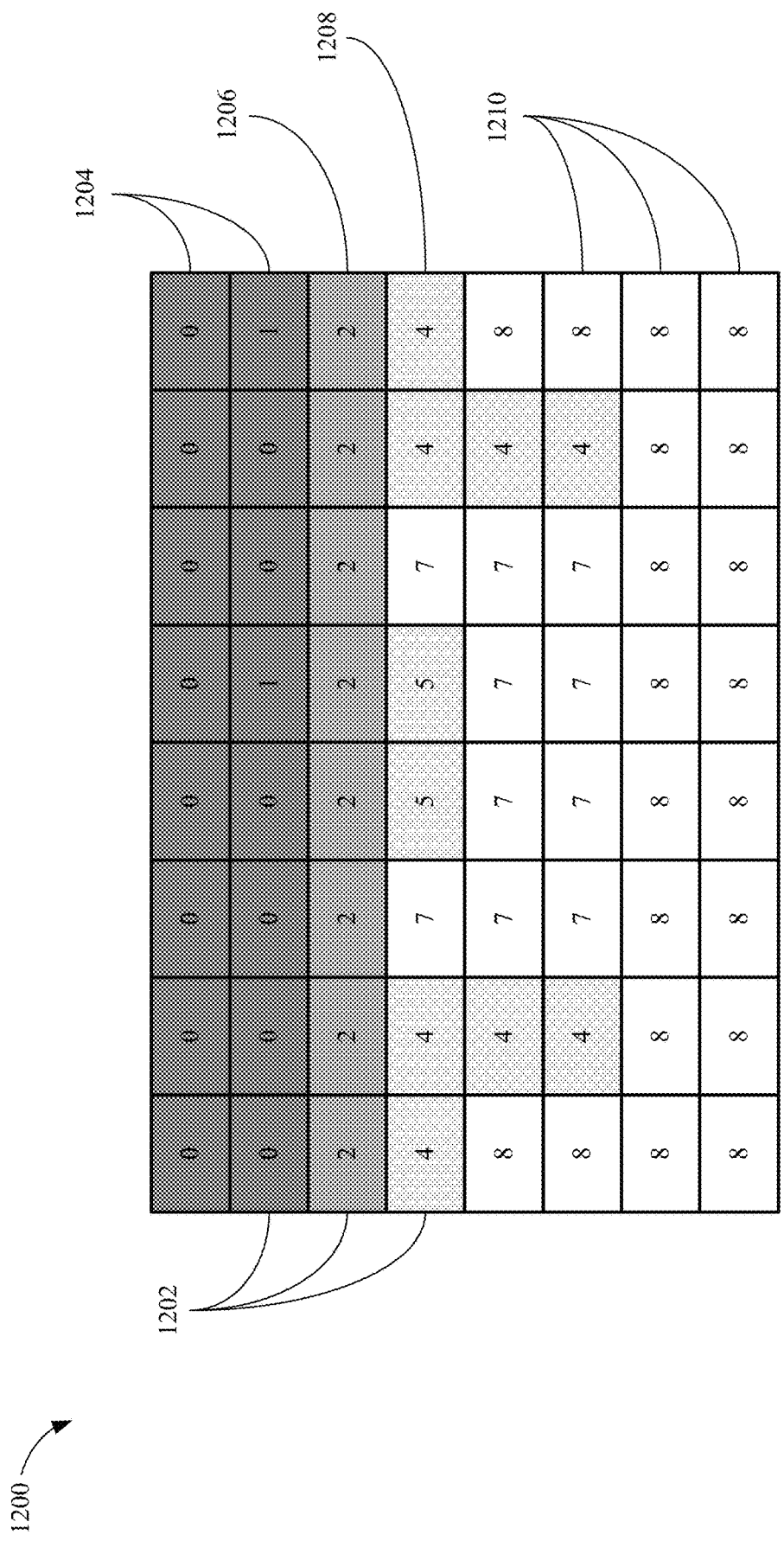
FIG. 12 is a depiction of example focus values determined for the focal regions.

The device 900 may then determine from the measurements a focus value for each focal region (1106). For example, the device 900 may determine a PD for each focal region if using PDAF (such as from photodiode measurements), or the device 900 may determine a contrast for each focal region if using CDAF (such as from an image capture by the image sensor of the camera 902). FIG. 12 is a depiction 1200 of focus values 1202 determined for the focal regions. For example, the depiction may be for an image of the scene 600 at an initial focal length, with the focus values 1202 of the focal regions corresponding to portions 602. If the initial focal length is set to the smallest focal length for the camera 902, objects at further depths from the camera 902 may appear more out of focus than objects at closer depths from the camera 902. The focus values 1202 depict an example contrast determined for each focal region for the scene 600 in FIG. 6. The shading for the focus values corresponds to the magnitude of a contrast (with a darker shading corresponding to a lower contrast). For example, focus values 1204 (which may correspond to the sky) are lower than focus values 1206 (which may correspond to the farthest end of the pier and the boats in the scene 600). Focus values 1206 are lower than focus values 1208 (which may correspond to the water on either side of the pier in the scene 600), and focus values 1208 are lower than focus values 1210 (which may correspond to the portion of the pier closest to the camera 902 and/or may be the ROI).

A higher contrast corresponds to the corresponding portion of the scene being closer to in focus. Therefore, focus values 1210 correspond to portions of the scene (such as the pier closest to the camera 902 in scene 600) being closer to in focus than portions of the scene corresponding to focus values 1204-1208. In some example implementations, the device 900 may normalize the focus values. For example, the contrasts may be normalized to a scale of 0-10, 0-9, or 1-10 for the focus values in the depiction 1200. In some other example implementations, the device 900 may use the focus values without normalization. Otherwise, the illustrated focus values may be another indication of the actual focus values determined. If a focus value is a PD instead of a contrast, a lower focus value (a focus value closer to zero) corresponds to the corresponding portion of the scene being closer to in focus than if the focus value is higher (a focus value further from zero). As a result, the change in value from focus values 1204 to focus values 1210 may decrease for PD instead of increase for contrast. Normalizing a PD may include normalizing a magnitude of the PD. Otherwise, the values may be another indication of the PD determined by the device 900 for each focal region.

Referring back to FIG. 11, the device 900 may determine if another focal length is to be set for the camera (1108). As described above, a device 900 performing CDAF may repeatedly adjust the focal length (such as performing coarse and fine adjustments) and measure the contrast until a final focal length is determined. Similarly, the device 900 may adjust the focal length and again determine the contrast for each focal region. In one example, the device 900 may step the camera lens through each focal length, determining contrasts for the focal regions at each focal length. In another example, the device 900 may adjust the focal length a fixed number of steps greater than one, and a focus value for focal lengths being skipped may be interpolated from the determined focus values. In a further example, the device 900 may vary the steps of adjusting the focal length, such as using larger steps for the edges of the range of focal lengths than for the middle of the range of focal lengths for the camera 902. Additionally, the camera lens may move through the focal lengths in one direction (such as from largest focal length to smallest focal length or smallest focal length to largest focal length), or the camera lens may move in either direction. Other suitable means for adjusting the focal length may be used, and the present disclosure should not be limited to any specific example for adjusting the focal length.

Figure 13:
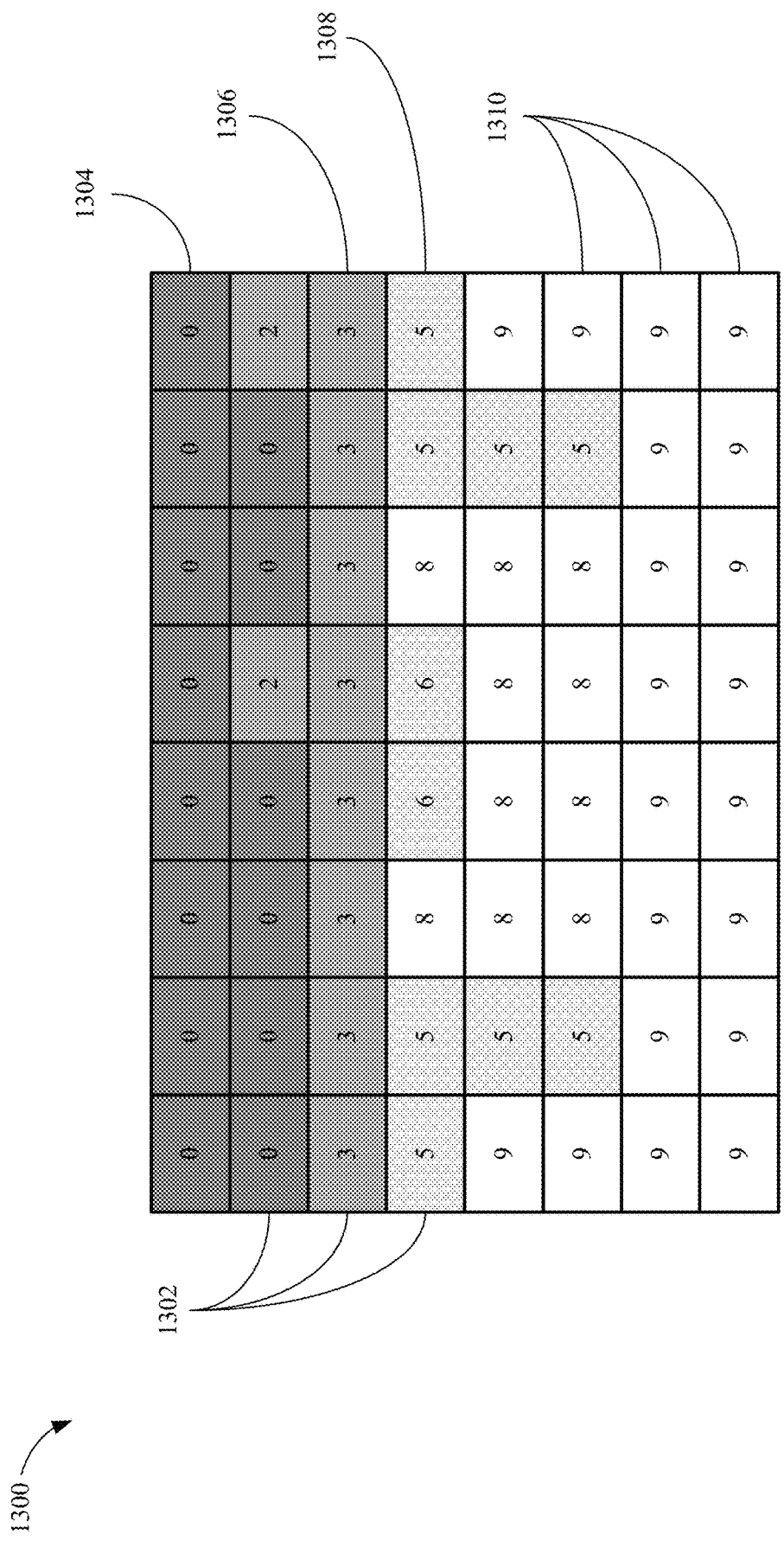
FIG. 13 is a depiction of example focus values for the focal regions at an adjusted focal length.

If the device 900 is to adjust the camera lens to another focal length (1108), the device 900 sets the camera lens to the next focal length (1110) and measures light intensities from the scene using the new focal length (with the process reverting to 1104). As a result, the device 900 may determine for a focal region multiple focus values, with each focus value associated with a different focal length. FIG. 13 is a depiction 1300 of focus values 1302 for the focal regions at an adjusted focal length. For example, if the focal length is increased by a step from the smallest focal length for the camera 902, the scene (or at least a portion of the scene) as captured in an image by the camera sensor for the adjusted focal length may appear closer to in focus than the scene as captured in a previous image for the initial focal length. As shown, the contrast may still increase from focus values 1304 through focus values 1306 and 1308 to focus values 1310.

Figure 14:
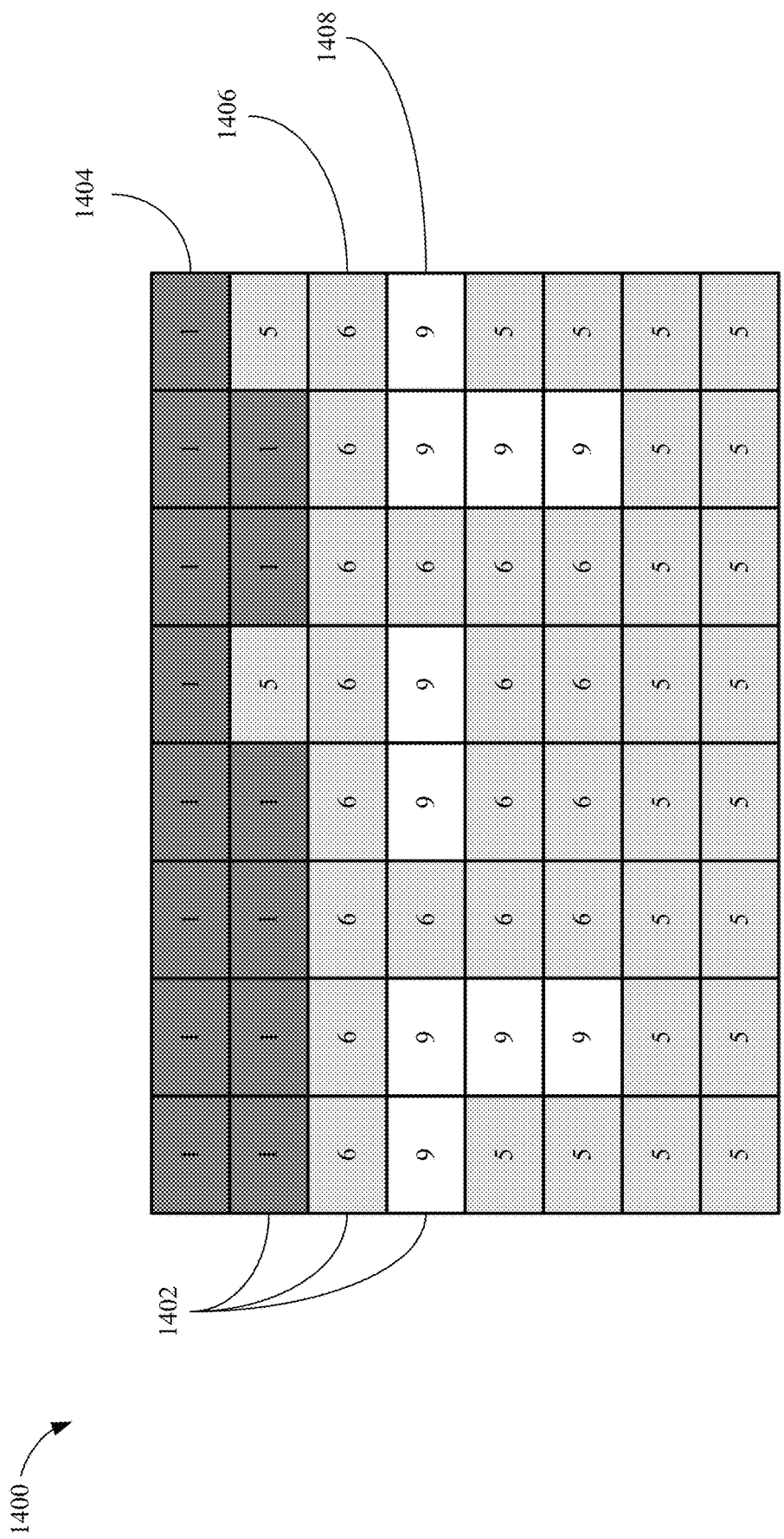
FIG. 14 is a depiction of example focus values for the focal regions at another adjusted focal length.

When recursively adjusting the focal length and determining the focus values, the focus values 1310 may begin to decrease at some focal length. For example, the portions of the scene (such as portions 602 in FIG. 6) corresponding to the focus values 1308 may be closer to in-focus (such as higher corresponding contrasts or lower corresponding PDs) than the portions of the scene 600 corresponding to the focus values 1310. FIG. 14 is a depiction 1400 of focus values 1402 at another adjusted focal length. For the focal length, the water to the left and right of the pier and the intermediate portion of the pier in the scene may be closer to in focus (such as higher contrasts or lower PDs) than the portion of the pier closest to the camera 902. Further, the portions of the scene corresponding to focus values 1306 and focus values 1310 in FIG. 13 (such as the end of the pier and the portion of the pier closest to the camera 902) may have similar focus values 1406 in FIG. 14, which is greater than the focus values 1404 (corresponding to the sky) but less than the focus values 1408 (corresponding to the water to the right and left of the pier and the intermediate portion of the pier).

Referring back to FIG. 11, if no other focal length is to be set for the camera 902 (1108), the device 900 may determine for each focal region a focal length for which the associated portion of the scene is in focus (1112). For example, the device 900 may set the camera lens from the shortest focal length to the longest focal length. Once the camera lens is adjusted to the longest focal length, the device 900 may not further adjust the focal length and determine for each focal region the focal length for which the associated portion of the scene is in focus. Alternatively, the device 900 may adjust the focal length any suitable number of times and in any suitable fashion. FIGS. 12-14 depict example focus values (which may be normalized or an indication of the focus values determined by the device 900) for the focal regions corresponding to the portions of the scene (such as corresponding to the portions 602 of scene 600 in FIG. 6) at different focal lengths. If the device 900 determines a contrast as the focus value, the device 900 determines for each focal region the focal length at which the contrast is the highest. If the device 900 determines a PD as the focus value, the device 900 determines for each focal region the focal length at which the PD is lowest (closest to zero). The group of example focus values (or example indications of focus values) in FIGS. 12-14 may be considered an example depth map of focus values.

Figure 15:
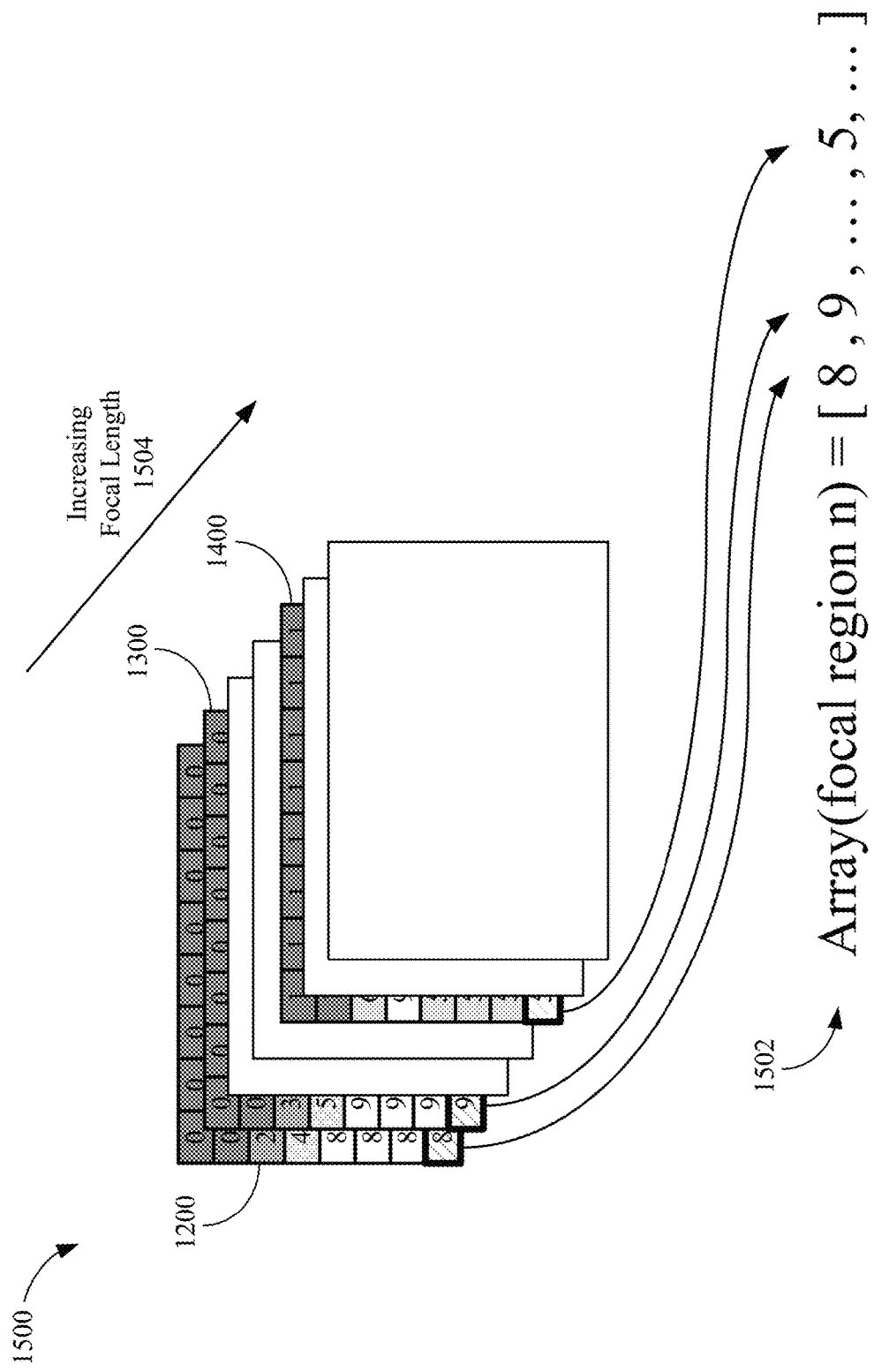
FIG. 15 is a depiction of an example array generated for a first focal region.

In some example implementations for determining the focal lengths for the focal regions, the device 900 may determine and store an array of focus values for each focal region. FIG. 15 is a depiction 1500 of an array generated for a first focal region. The focus values for the same focal region across the different focal lengths may be included in the array. For example, the depictions 1200, 1300, and 1400 of focus values may be across an increasing focal length 1504 and included with other focus values determined at different focal lengths. If focal region n corresponds to the bottom left focal region for the camera sensor, the array includes 8 as the first value (the bottom left focus value in depiction 1200 of focus values), 9 as the second value (the bottom left focus value in depiction 1300 of focus values), and 5 as an intermediate value (the bottom left focus value in depiction 1400 of focus values). An array similar to array 1502 may be generated and stored for each focal region. In some example implementations, the arrays may be stored in the memory 906 of device 900 or in another storage included in or remote to the device 900.

The same position in the arrays corresponds to the same focal length. For example, the first position in each of the arrays may correspond to an initial focal length, the second position may correspond to the first adjusted focal length, and so on until the last position corresponds to the final adjusted focal length. In this manner, the device 900 may determine which array position includes the largest contrast or the smallest PD, which corresponds to a focal length for which the portion of the scene corresponding to the focal region is closest to in focus for the camera 902.

Figure 16:
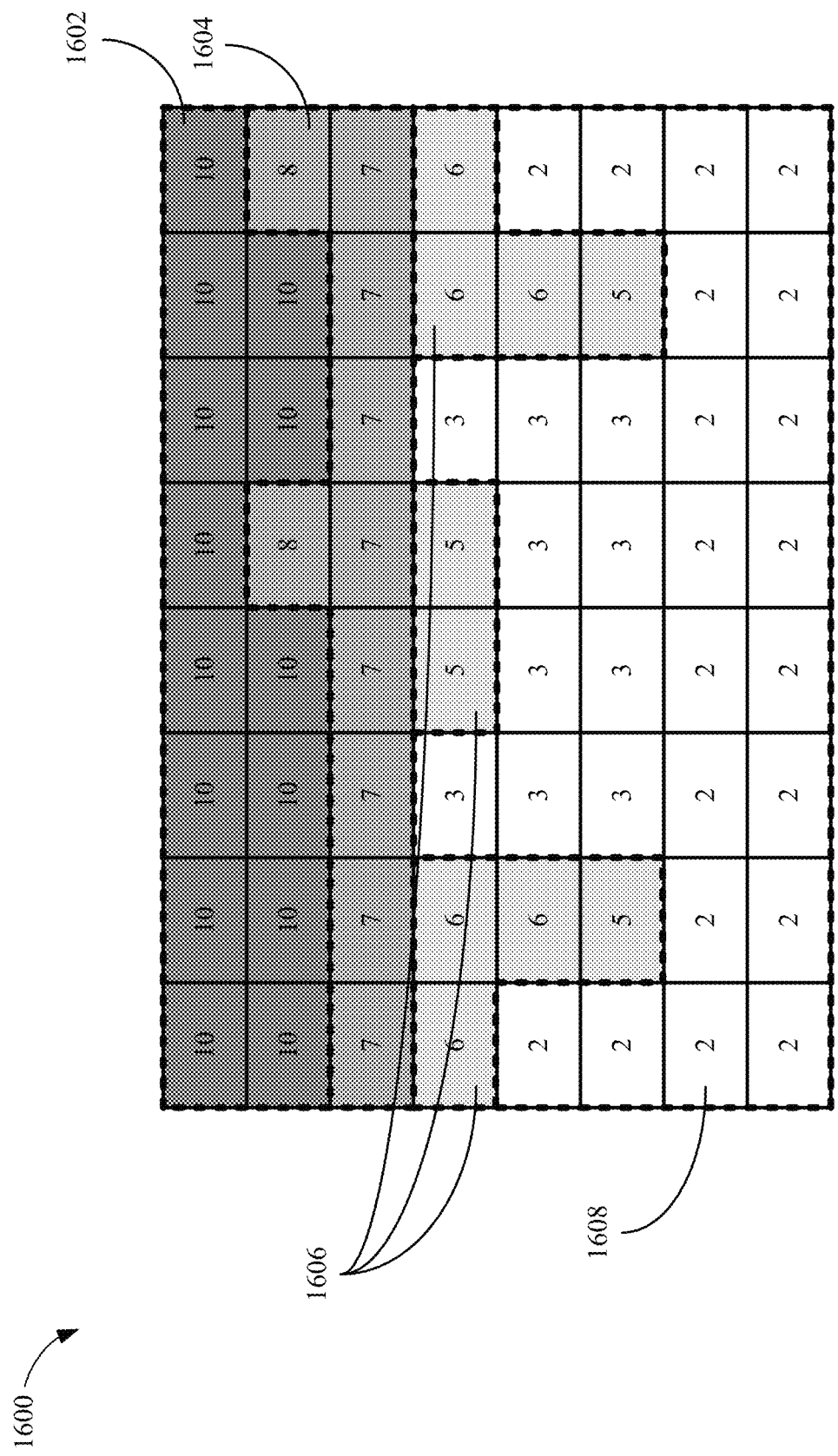
FIG. 16 is a depiction of an example depth map of focal lengths for the focal regions for FIG. 12 through FIG. 14.

Referring back to FIG. 11, the device 900 may generate a depth map of the determined focal lengths for the focal regions (1114). The depth map of focal lengths may instead include indications of the focal lengths determined for the focal regions. The values in the depth map may be, e.g., an array position determined for each focal region, a determined focal length for each focal region, a normalized value (such as from 1-10) indicating a determined focal length for each focal region, a number of steps from an initial focal length, or any other suitable indication of the focal length. FIG. 16 is a depiction of an example depth map 1600 of normalized focal lengths for the focal regions for FIG. 12 through FIG. 14. For the example depth map 1600, the focal lengths are normalized to a range of 1-10. As shown, the focal lengths in the group 1602 may be similar, the focal lengths in the group 1604 may be similar, the focal lengths in the groups 1606 may be similar, and the focal lengths in the group of 1608 may be similar.

While FIGS. 11-15 illustrate that multiple focal lengths may be used, the device 900 alternatively may use one focal length to generate a depth map. For example, if the device 900 performs PDAF, a determined PD for each focal region at one focal length may be used to determine a final focal length for each focal region and generate the depth map from the final focal lengths. In the example, the device 900 may optionally generate a depth map of focus values and use the depth map of focus values to generate a depth map of focal lengths. In another example, the device 900 may still use multiple focal lengths even if determining PDs as focus values, and the present disclosure should not be limited to a specific number of focal lengths to be used in generating a depth map.

Figure 17:
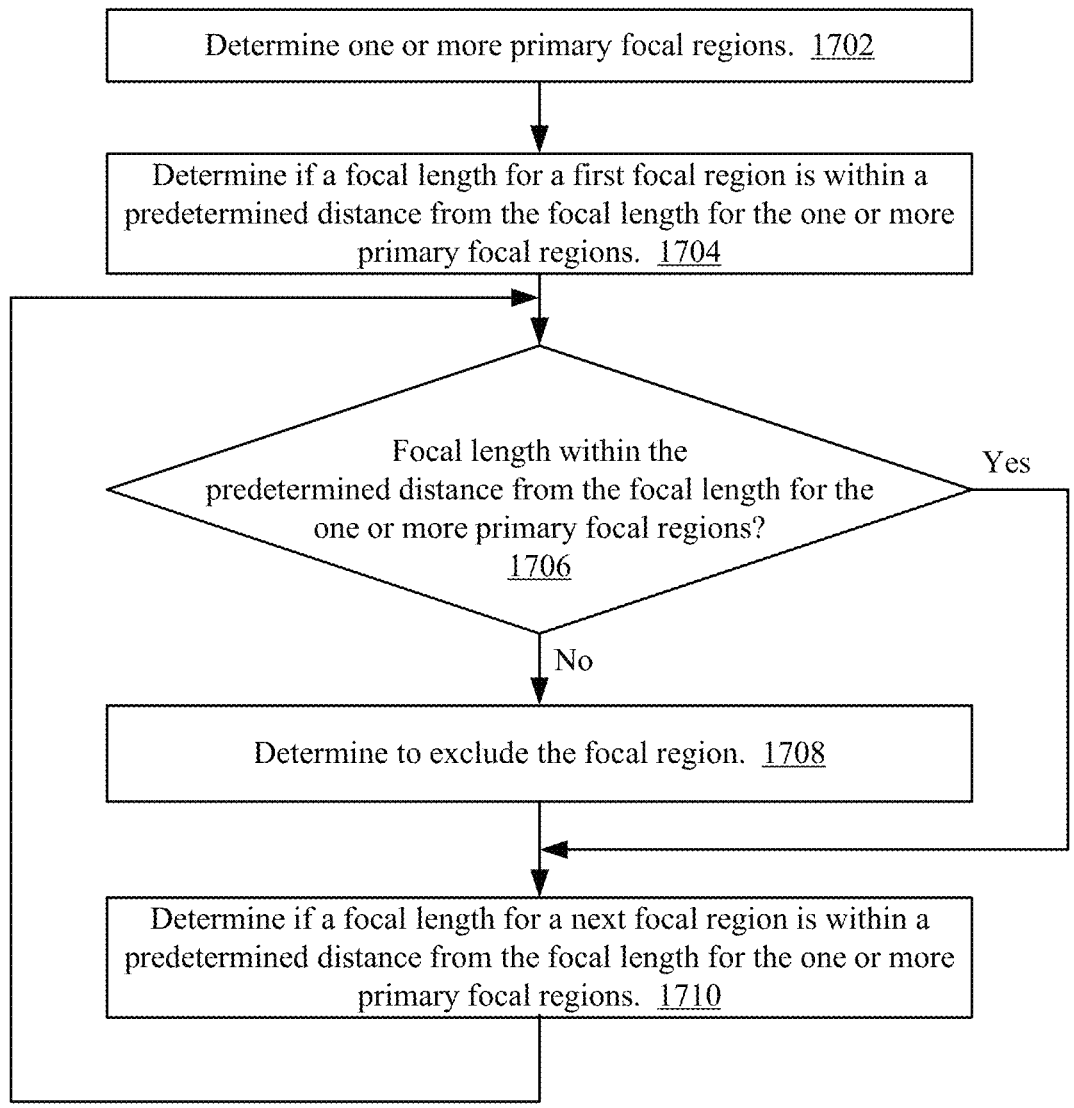
FIG. 17 is an illustrative flow chart depicting an example operation for using a generated depth map of focal lengths to determine which focal regions to exclude.

The device 900 may use a generated depth map of focal lengths to determine one or more focal regions to be excluded from use in triggering an AF operation or performing an AF operation. FIG. 17 is an illustrative flow chart depicting an example operation 1700 for using a generated depth map of focal lengths to determine which focal regions to exclude. Example operation 1700 may be an example implementation of step 1004 in FIG. 10.

Beginning at 1702, the device 900 may determine one or more primary focal regions. In some example implementations, a camera 902 focal length may be set to place contents at the center of the camera 902 field of capture in focus, and the device 900 may determine one or more center focal regions to be the primary focal regions. In some other example implementations, the device 900 may identify one or more faces in a field of capture of the camera 902, and the device 900 may determine one or more focal regions corresponding to the location(s) of the one or more faces to be the primary focal regions. In some further example implementations, the device 900 may receive a user input (such as a user touching a portion of a preview on the display 914) to indicate a ROI, and the device 900 may determine one or more focal regions corresponding to the location in the scene of the user input.

After determining one or more primary focal regions (1702), the device 900 may determine from the depth map whether any other focal regions have a determined focal length similar to the focal length(s) for the one or more primary focal regions. In some example implementations, the device 900 may begin at a first focal region and determine if its focal length from the depth map is within a predetermined distance from the focal length of the one or more primary focal regions (1704). In one example, the device 900 may determine if the determined focal lengths are the same for the first focal region and the one or more primary focal regions. As a result, the tolerance in depths in the scene may be minimized in determining which focal regions to use for triggering or performing an AF operation. If the predetermined distance is greater than zero, the tolerance in depths is greater than the tolerance in depths for the predetermined distance being zero. As a result, the number of focal regions to be excluded may decrease as the predetermined distance increases.

In some example implementations, the device 900 may determine a reference focal length from the determined focal lengths for the one or more primary focal regions. The device 900 may then compare the reference focal length to the determined focal lengths in the depth map.

If the determined focal length for the focal region is not within the predetermined distance from the focal length for the one or more primary focal regions (1706), the device 900 may determine to exclude the focal region from being used in triggering an AF operation or performing an AF operation (1708). If the determined focal length for the focal region is within the predetermined distance from the focal length for the one or more primary focal regions (1706), the device 900 may determine to use the focal region for triggering an AF operation or performing an AF operation. As a result, the device 900 may not exclude the focal region (not shown), with the process continuing to 1710. In 1710, the device 900 may determine if a next focal region's focal length from the depth map is within a predetermined distance from the focal length of the one or more primary focal regions (1710). Step 1710 may be performed similarly to 1704, as described above.

In some additional or alternative implementations, the device 900 may compare a focal length of a primary focal region to the focal lengths of other primary focal regions (not shown) to determine whether to exclude one of the primary focal regions. For example, if the device 900 determines four focal regions corresponding to the scene of capture for the camera 902 to be the primary focal regions, the device 900 may determine if a focal length of one of the four focal regions is an outlier compared to the other three focal lengths (such as if the focal length for one primary region is more than the predetermined distance away from the focal lengths for the other three focal regions). As such, one or more primary focal regions may be excluded in addition or alternative to one or more non-primary focal regions being excluded.

In some additional example implementations, instead of determining one or more primary focal regions, the device 900 may compare a difference between the final focal length determined from the previous AF operation and the determined focal lengths in the depth map. The device 900 may store the final focal length for the camera 902 from a previous AF operation. For example, if the device 900 is completing initialization of the camera 902, the focal length of the camera 902 determined during the AF operation during initialization may be stored. The stored focal length or the focal length determined from the previous AF operation may be considered the reference focal length.

Figure 18:
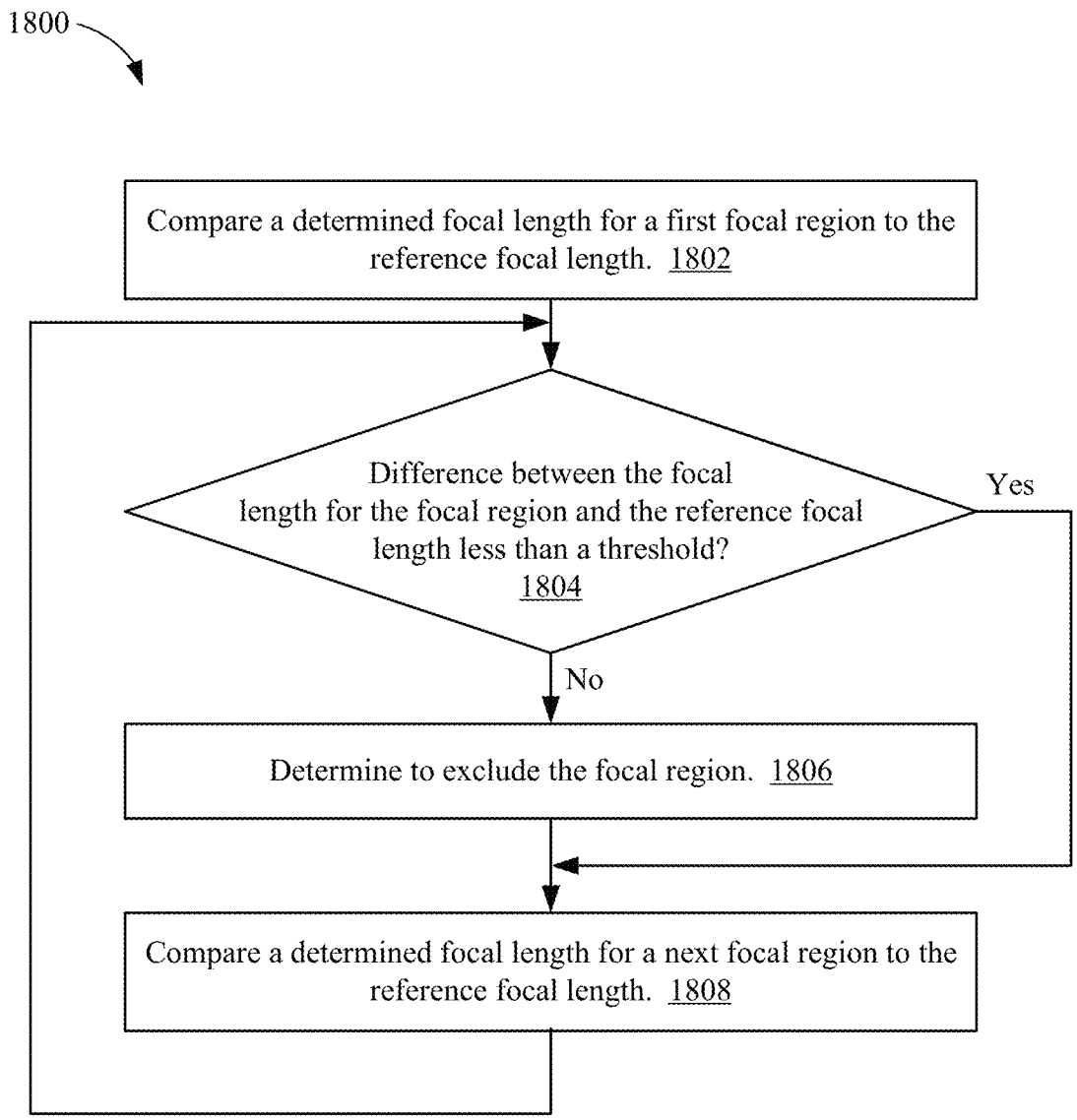
FIG. 18 is an illustrative flow chart depicting an example operation for determining which focal regions to exclude.

FIG. 18 is an illustrative flow chart depicting an example operation 1800 for determining which focal regions to exclude. Beginning at 1802, the device 900 may compare a determined focal length for a first focal region to the reference focal length. For example, the determined focal length may be the focal length at which the portion of the scene corresponding to the first focal region is in focus (such as the focal length corresponding to the highest contrast or the PD closest to zero as compared to the other focal lengths). In some example implementations, the focal length for the first focal region may be the first focal region's focal length indicated by a generated depth map of focal lengths for the focal regions.

If the difference between the focal length for the focal region and the reference focal length is greater than a threshold (1804), the device 900 may determine to exclude the focal region from being used to determine whether to trigger an AF operation or to perform an AF operation (1806). The device 900 may then compare a determined focal length for a next focal region to the reference focal length (1808), and the process reverts to decision block 1804. If the difference between the focal length for the focal region and the reference focal length is less than a threshold (1804), the device 900 may not exclude the focal region from being used to determine when to trigger an AF operation or to perform an AF operation. In this manner, the process may skip to 1808, and the device 900 may compare a determined focal length for a next focal region to the reference focal length. Steps 1804-1808 may be repeated for each of the focal regions, and the device 900 thus determines which focal regions to exclude.

When the device 900 determines the one or more focal regions that are to be excluded from use in triggering an AF operation or performing an AF operation, the device 900 may exclude the determined focal regions. In some example implementations, the device 900 may use the remaining focal regions to determine an overall focus value to be used in determining whether to trigger an AF operation. In some other example implementations, the device 900 may use the remaining focal regions to perform an AF operation (such as CDAF or PDAF) to determine a new focal length for the camera 902.

The device 900 may determine to exclude one or more focal regions or generate a depth map of determined focal lengths at any frequency. For example, if a scene changes and then remains stable for a threshold number of image frames from the camera 902, the device 900 may again determine which of all of the focal regions to exclude from use in further determining whether to trigger an AF operation or in performing an AF operation.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 906 in the example device 900 of FIG. 9) comprising instructions 908 that, when executed by the processor 904 (or the camera controller 910 or the image signal processor 912), cause the device 900 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 904 or the image signal processor 912 in the example device 900 of FIG. 9. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor and/or any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 900, the camera controller 910, the processor 904, and/or the image signal processor 912, may be performed in any order and at any frequency (such as steps 1704-1710 in FIG. 17 or steps 1802-1808 in FIG. 18 may be performed in any order of focal regions and/or concurrently for multiple focal regions). Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for a device to generate a depth map, comprising:
   receiving a first intensity measurement for each of a plurality of focal regions of a camera sensor of a camera at a first focal length;
   determining, from the first intensity measurements, a first focus value for each of the plurality of focal regions;
   adjusting the first focal length of the camera;
   receiving a second intensity measurement for each of the plurality of focal regions at the adjusted focal length;
   determining, from the second intensity measurements, a second focus value for each of the plurality of focal regions;
   generating, for each of the plurality of focal regions, an array of focus values at different focal lengths, wherein the array comprises the first focus value at the first focal length and the second focus value at the adjusted focal length;
   comparing, for each of the plurality of focal regions, the first focus value and the second focus value;
   determining for each of the plurality of focal regions, based on the comparison, a focal length of the camera at which a portion of a scene corresponding to the focal region is in focus for the camera;
   generating a depth map including an indication of the focal length for each of the plurality of focal regions; and
   using the depth map in determining when to perform or in performing an autofocus operation for the camera.

2. The method of claim 1, wherein the first focus value is one from the group consisting of:
   a contrast; and
   a phase difference (PD).

3. The method of claim 1, wherein:
   comparing the first focus value to the second focus value comprises determining one focus value from the array of focus values that is one from the group consisting of:
      a highest contrast from the array of focus values when the focus values are contrasts; and
      a PD closest to zero from the array of focus values when the focus values are PDs; and
   the focal length of the camera at which the portion of the scene corresponding to the focal region is in focus for the camera corresponds to a position of the determined one focus value from the array of focus values.

4. The method of claim 3, further comprising:
   generating, based on the first focus values, a first depth map of focus values for the first focal length; and
   generating, based on the second focus values, a second depth map of focus values for the adjusted focal length, wherein generating the array of focus values for the focal region comprises populating the array with focus values from a same position in the first depth map of focus values and the second depth map of focus values.

5. The method of claim 3, wherein each array of focus values comprises a number of positions equal to a number of different focal lengths for the camera.

6. The method of claim 1, wherein the first intensity and the second intensity are light intensities.

7. A device configured to generate a depth map, comprising:
   one or more processors; and
   a memory coupled to the one or more processors and comprising instructions that, when executed by the one or more processors, cause the device to:
      receive a first intensity measurement for each of a plurality of focal regions of a camera sensor of a camera at a first focal length;
      determine, from the first intensity measurements, a first focus value for each of the plurality of focal regions;
      adjust the first focal length of the camera;
      receive a second intensity measurement for each of the plurality of focal regions at the adjusted focal length;
      determine, from the second intensity measurements, a second focus value for each of the plurality of focal regions;
      generate, for each of the plurality of focal regions, an array of focus values at different focal lengths, wherein the array comprises the first focus value at the first focal length and the second focus value at the adjusted focal length;
      compare, for each of the plurality of focal regions, the first focus value and the second focus value;
      determine for each of the plurality of focal regions, based on the comparison, a focal length of the camera at which a portion of a scene corresponding to the focal region is in focus for the camera;
      generate a depth map including an indication of the focal length for each of the plurality of focal regions; and
      use the depth map in determining when to perform or in performing an autofocus operation for the camera.

8. The device of claim 7, wherein the first focus value is one from the group consisting of:
   a contrast; and
   a phase difference (PD).

9. The device of claim 7, wherein:
   comparing the first focus value to the second focus value comprises determining one focus value from the array of focus values that is one from the group consisting of:
      a highest contrast from the array of focus values when the focus values are contrasts; and
      a PD closest to zero from the array of focus values when the focus values are PDs; and
   the focal length of the camera at which the portion of the scene corresponding to the focal region is in focus for the camera corresponds to a position of the determined one focus value from the array of focus values.

10. The device of claim 9, wherein the instructions, when executed by the one or more processors, further cause the device to:
    generate, based on the first focus values, a first depth map of focus values for the first focal length; and
    generate, based on the second focus values, a second depth map of focus values for the adjusted focal length, wherein generating the array of focus values for the focal region comprises populating the array with focus values from a same position in the first depth map of focus values and the second depth map of focus values.

11. The device of claim 9, wherein each array of focus values comprises a number of positions equal to a number of different focal lengths for the camera.

12. The device of claim 7, wherein the first intensity and the second intensity are light intensities.

13. The device of claim 7, further comprising:
the camera coupled to the one or more processors, wherein the camera is configured to sense light for the first intensity measurements and the second intensity measurements.

14. A non-transitory computer-readable medium storing one or more programs containing instructions that, when executed by one or more processors of a device, cause the device to:
receive a first intensity measurement for each of a plurality of focal regions of a camera sensor of a camera at a first focal length;
determine, from the first intensity measurements, a first focus value for each of the plurality of focal regions;
adjust the first focal length of the camera;
receive a second intensity measurement for each of the plurality of focal regions at the adjusted focal length;
determine, from the second intensity measurements, a second focus value for each of the plurality of focal regions;
generate, for each of the plurality of focal regions, an array of focus values at different focal lengths, wherein the array comprises the first focus value at the first focal length and the second focus value at the adjusted focal length;
compare, for each of the plurality of focal regions, the first focus value and the second focus value;
determine for each of the plurality of focal regions, based on the comparison, a focal length of the camera at which a portion of a scene corresponding to the focal region is in focus for the camera;
generate a depth map including an indication of the focal length for each of the plurality of focal regions; and
use the depth map in determining when to perform or in performing an autofocus operation for the camera.

15. The non-transitory computer-readable medium of claim 14, wherein the first focus value is one from the group consisting of:
a contrast; and
a phase difference (PD).

16. The non-transitory computer-readable medium of claim 14, wherein:
comparing the first focus value to the second focus value comprises determining one focus value from the array of focus values that is one from the group consisting of:
a highest contrast from the array of focus values when the focus values are contrasts; and
a PD closest to zero from the array of focus values when the focus values are PDs; and
the focal length of the camera at which the portion of the scene corresponding to the focal region is in focus for the camera corresponds to a position of the determined one focus value from the array of focus values.

17. The non-transitory computer-readable medium of claim 16, wherein the instructions, when executed by the one or more processors, further cause the device to:
generate, based on the first focus values, a first depth map of focus values for the first focal length; and
generate, based on the second focus values, a second depth map of focus values for the adjusted focal length,
wherein generating the array of focus values for the focal region comprises populating the array with focus values from a same position in the first depth map of focus values and the second depth map of focus values.

18. The non-transitory computer-readable medium of claim 14, wherein the first intensity and the second intensity are light intensities.

19. A device configured to generate a depth map, comprising:
means for receiving a first intensity measurement for each of a plurality of focal regions of a camera sensor of a camera at a first focal length;
means for determining, from the first intensity measurements, a first focus value for each of the plurality of focal regions;
means for adjusting the first focal length of the camera;
means for receiving a second intensity measurement for each of the plurality of focal regions at the adjusted focal length;
means for determining, from the second intensity measurements, a second focus value for each of the plurality of focal regions;
means for generating, for each of the plurality of focal regions, an array of focus values at different focal lengths, wherein the array comprises the first focus value at the first focal length and the second focus value at the adjusted focal length;
means for comparing, for each of the plurality of focal regions, the first focus value and the second focus value;
means for determining for each of the plurality of focal regions, based on the comparison, a focal length of the camera at which a portion of a scene corresponding to the focal region is in focus for the camera;
means for generating a depth map including an indication of the focal length for each of the plurality of focal regions; and
means for using the depth map in determining when to perform or in performing an autofocus operation for the camera.

20. The device of claim 19, wherein the first focus value is one from the group consisting of:
a contrast; and
a phase difference (PD).

21. The device of claim 19, wherein:
comparing the first focus value to the second focus value comprises determining one focus value from the array of focus values that is one from the group consisting of:
a highest contrast from the array of focus values when the focus values are contrasts; and
a PD closest to zero from the array of focus values when the focus values are PDs; and
the focal length of the camera at which the portion of the scene corresponding to the focal region is in focus for the camera corresponds to a position of the determined one focus value from the array of focus values.

22. The device of claim 21, further comprising:
means for generating, based on the first focus values, a first depth map of focus values for the first focal length; and
means for generating, based on the second focus values, a second depth map of focus values for the adjusted focal length,
wherein generating the array of focus values for the focal region comprises populating the array with focus values from a same position in the first depth map of focus values and the second depth map of focus values.

23. The device of claim 19, wherein the first intensity and the second intensity are light intensities.

* * * * *